April 24, 1945. B. J. GOLDSMITH 2,374,537
AUTOMATIC ARTICLE SELECTING SYSTEM AND APPARATUS
Filed March 27, 1940 12 Sheets-Sheet 9
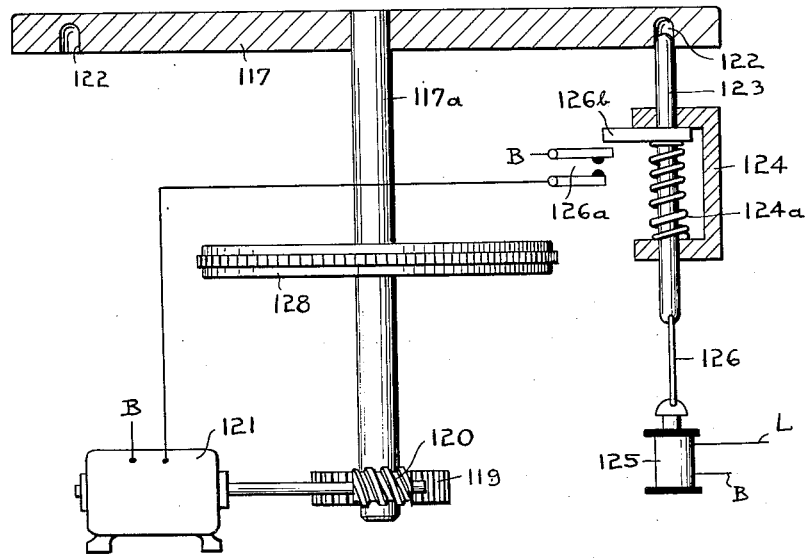
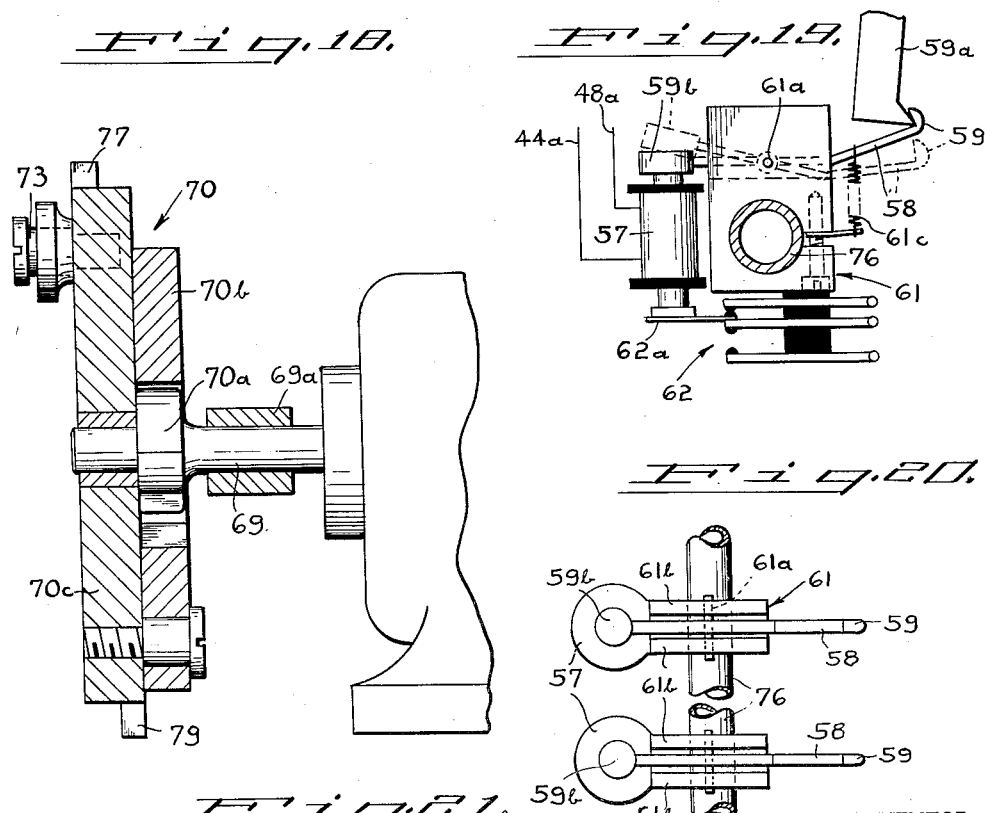
INVENTOR.
BERTRAM J. GOLDSMITH
BY
ATTORNEY.

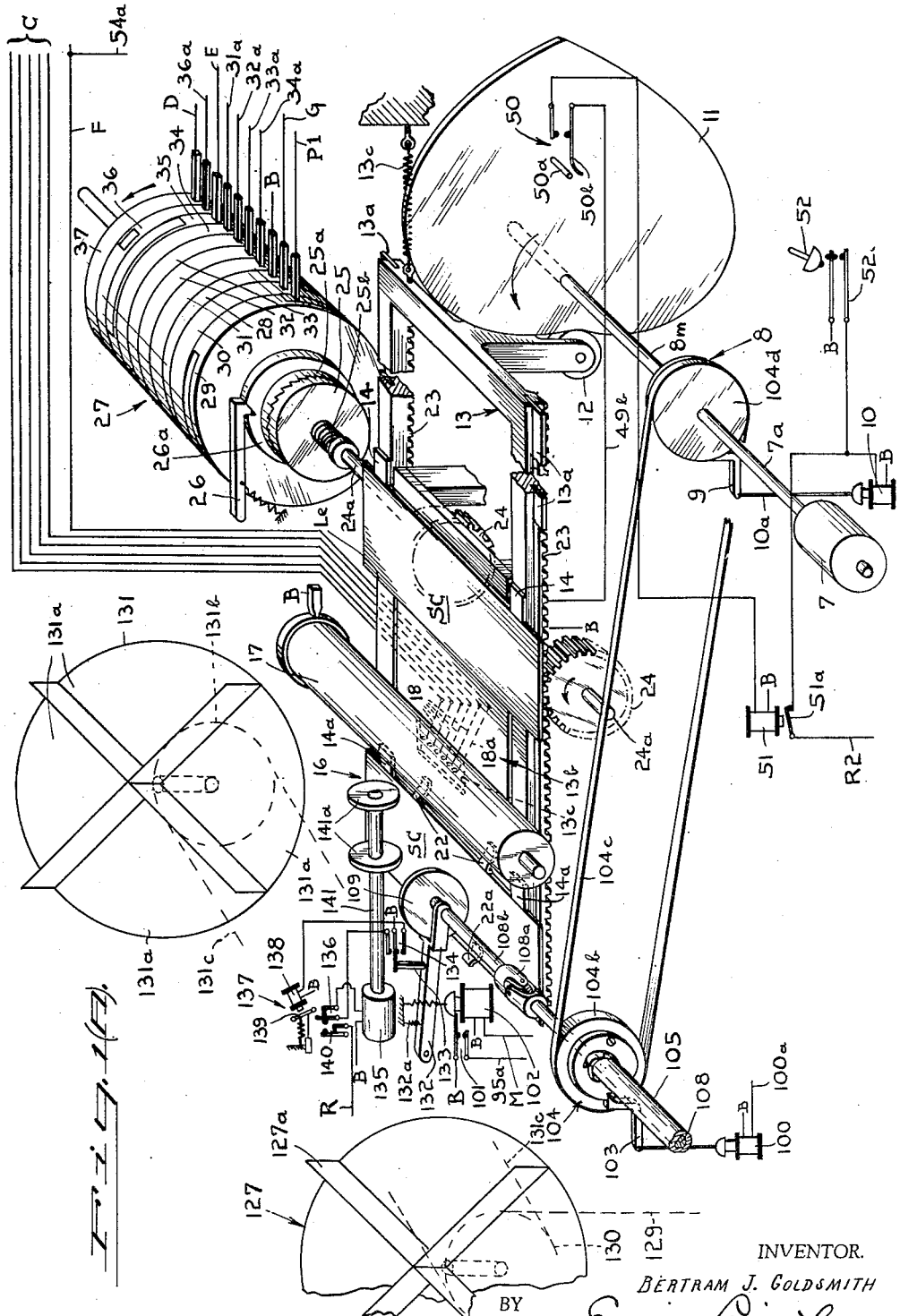

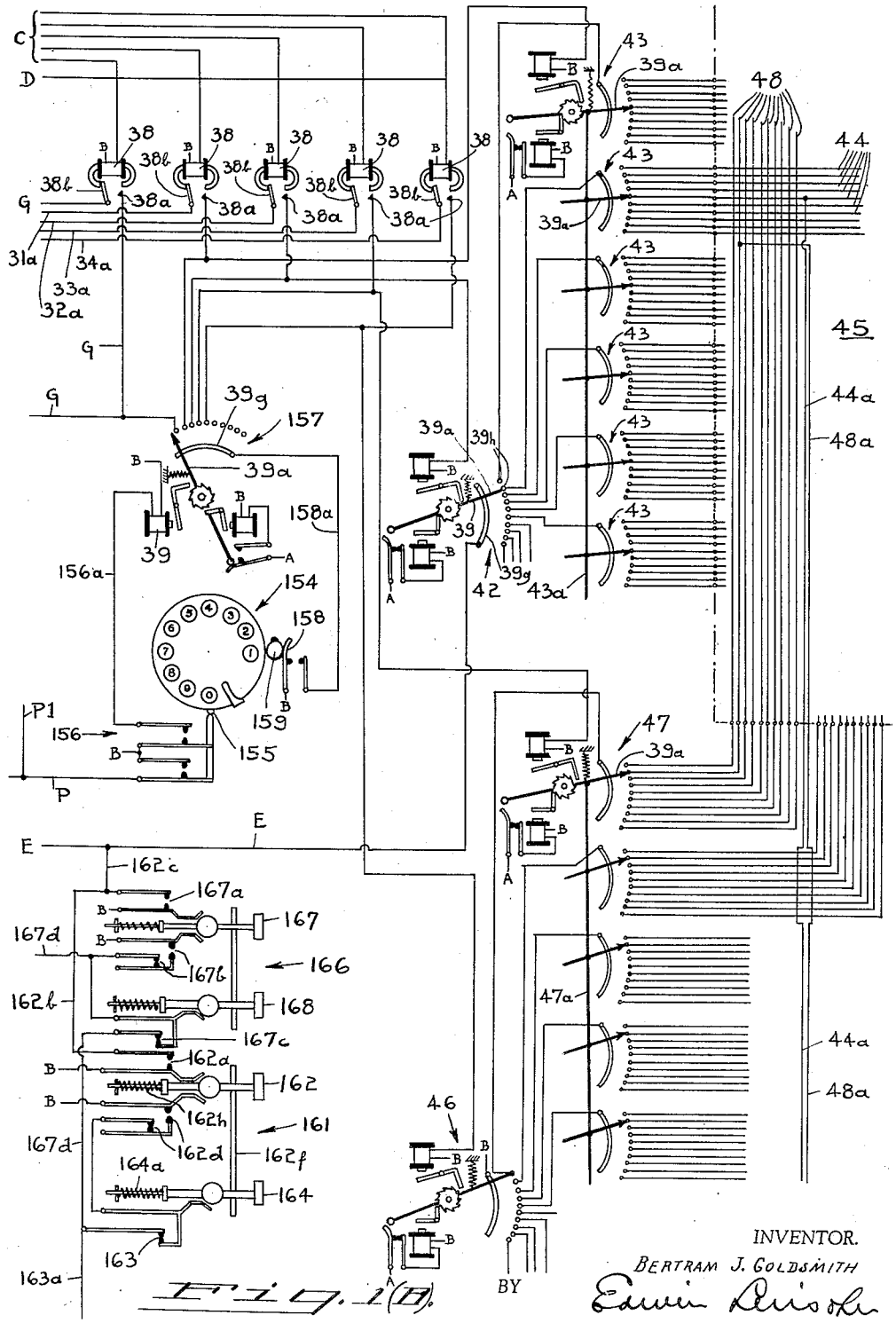

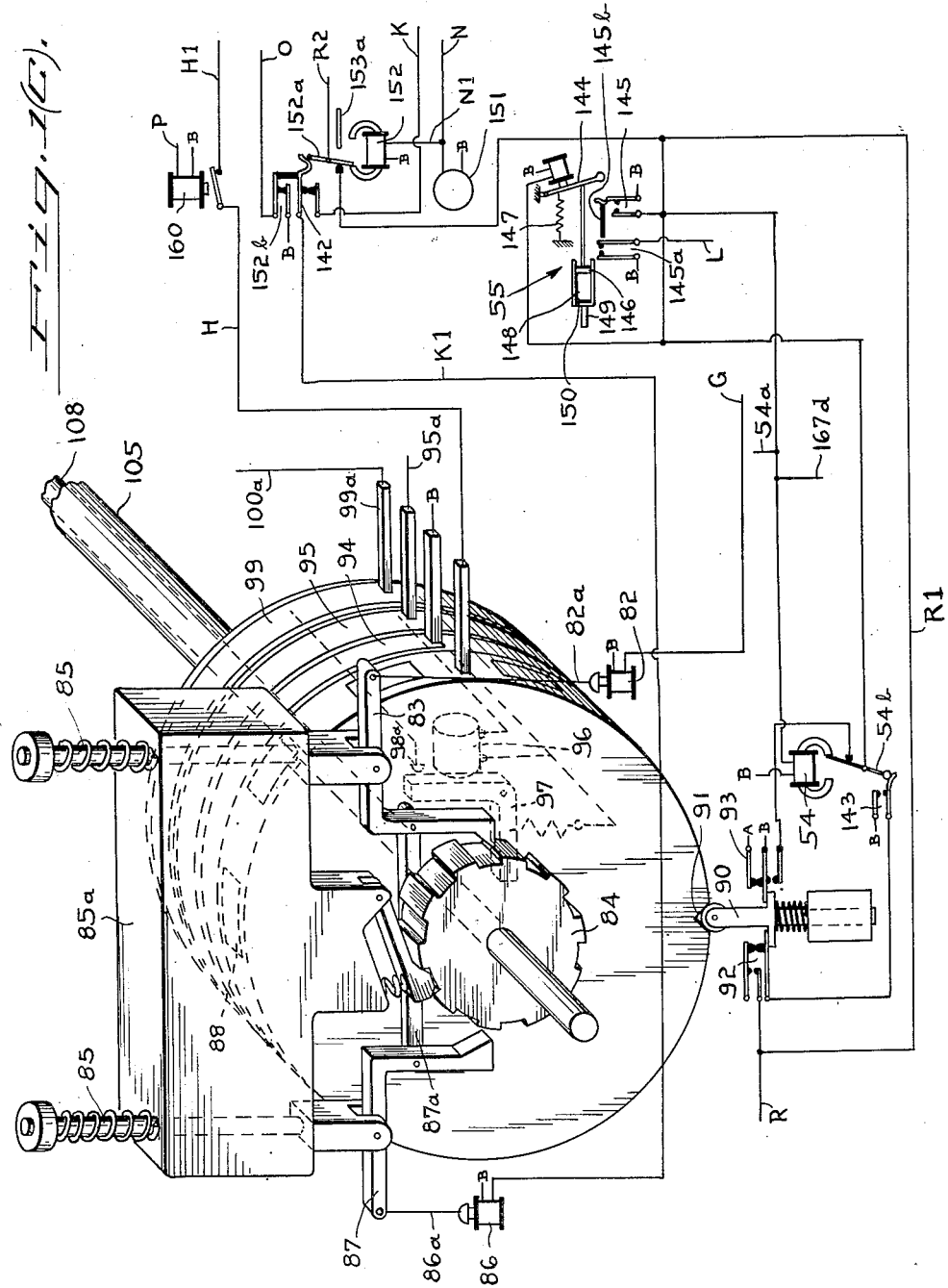

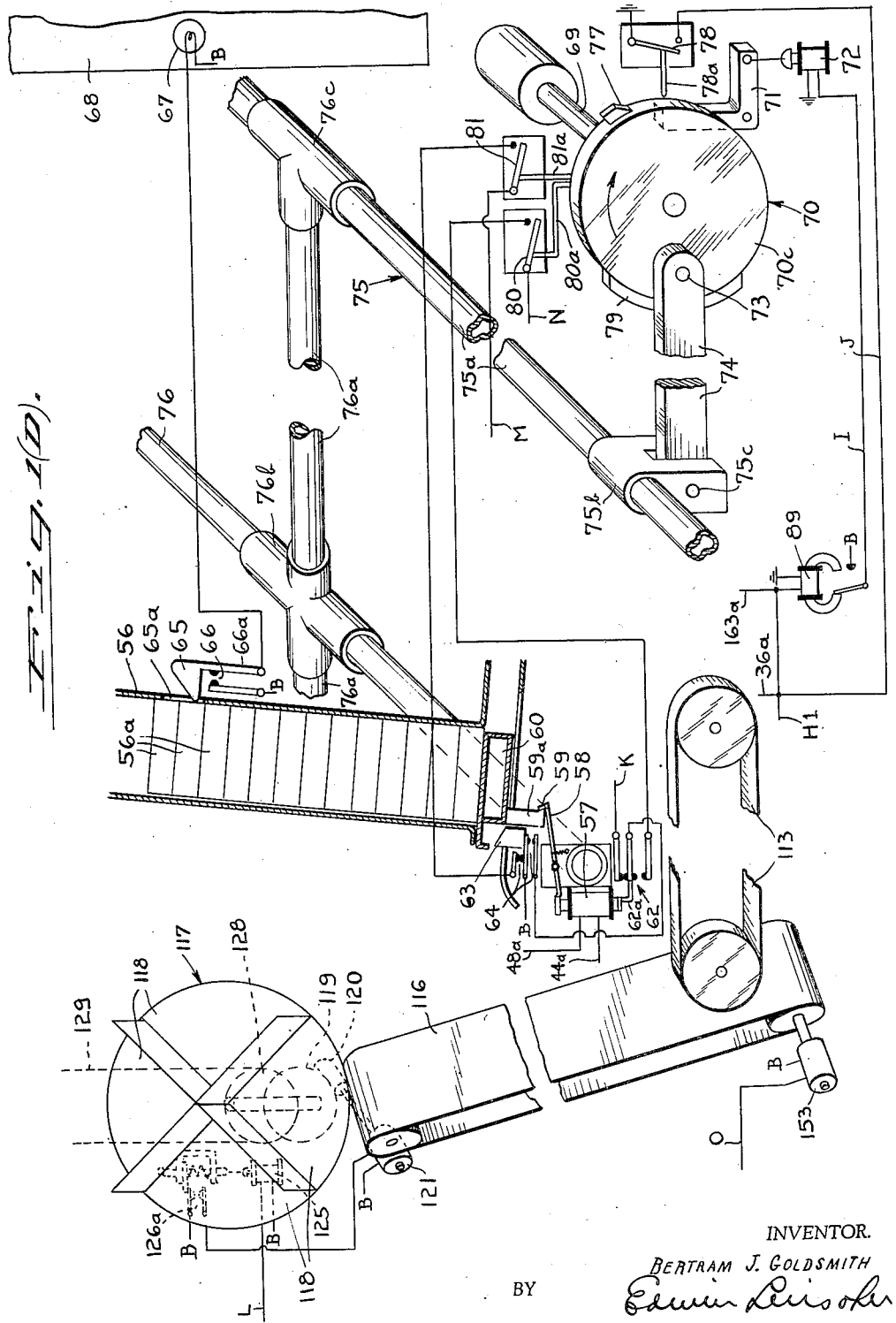

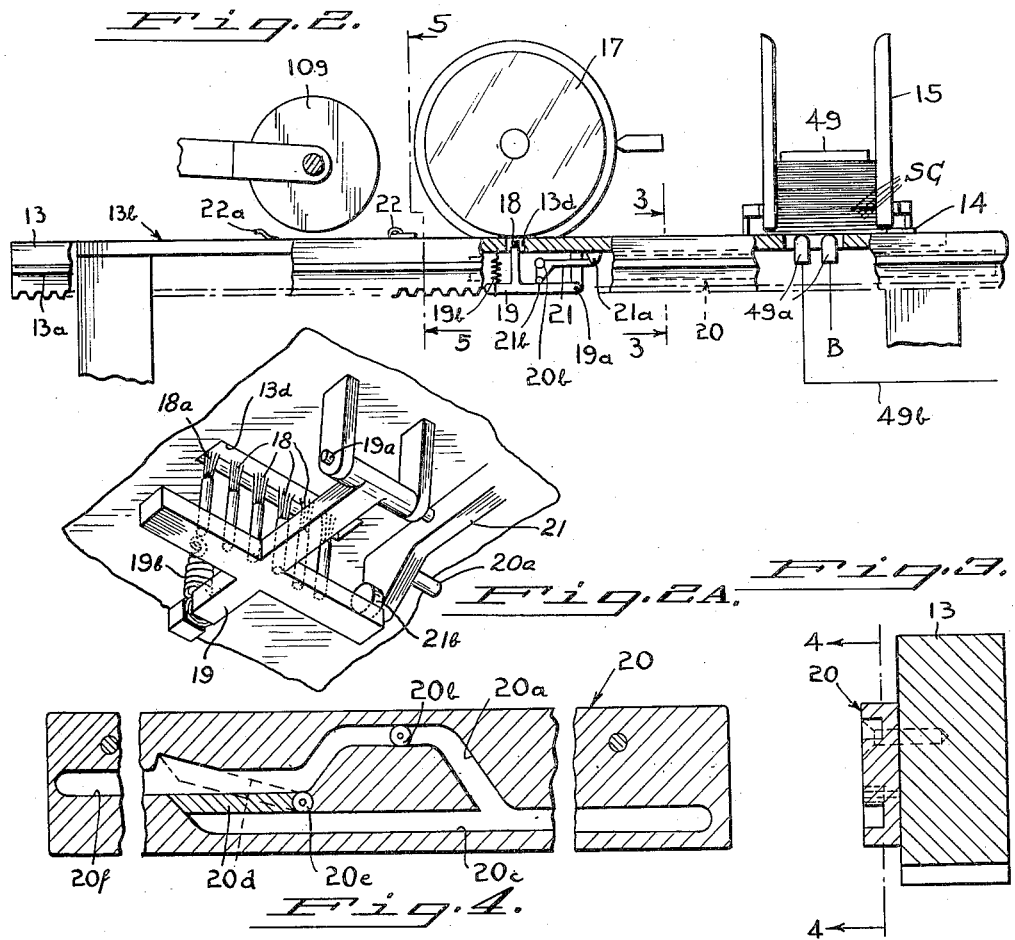

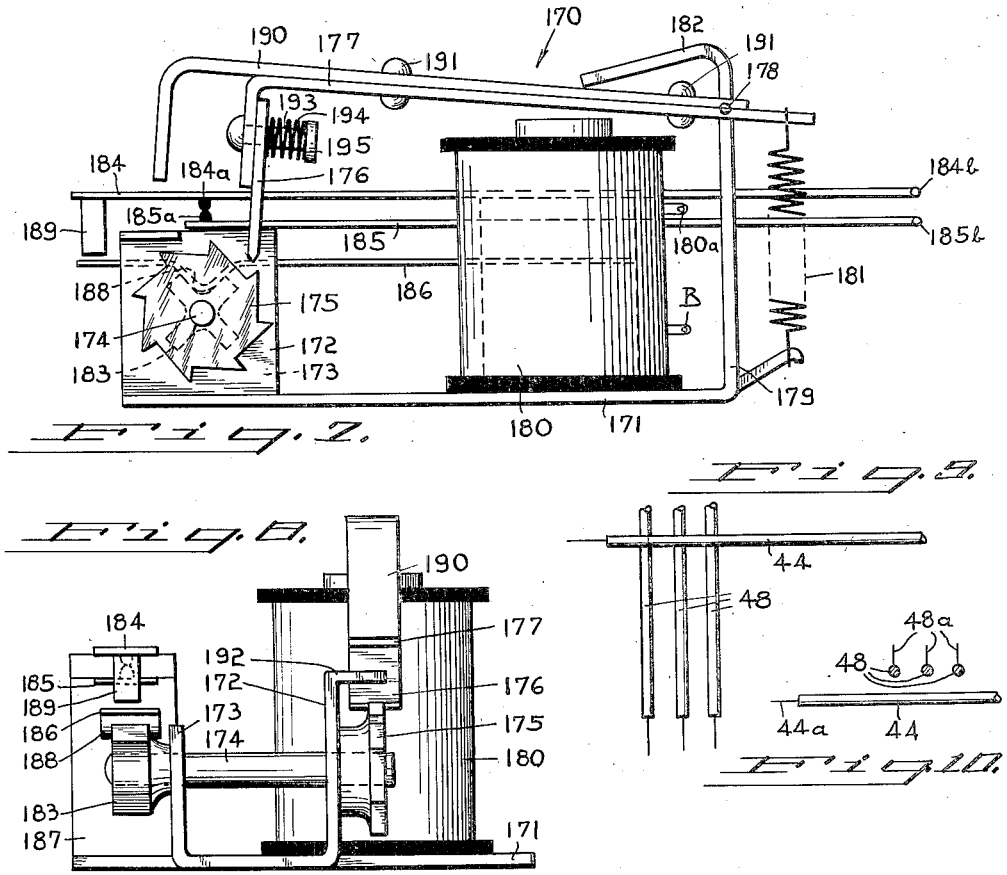

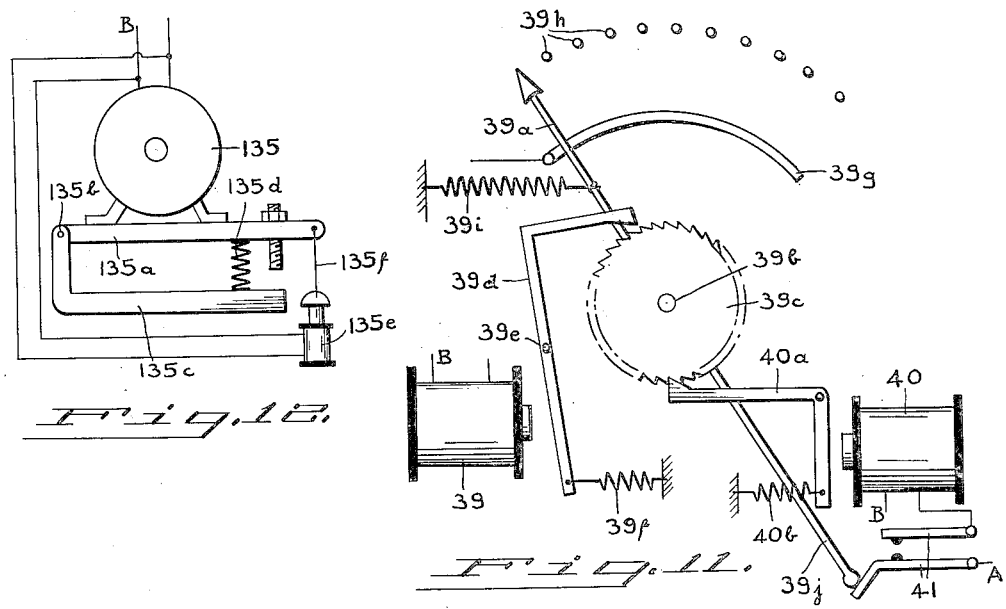
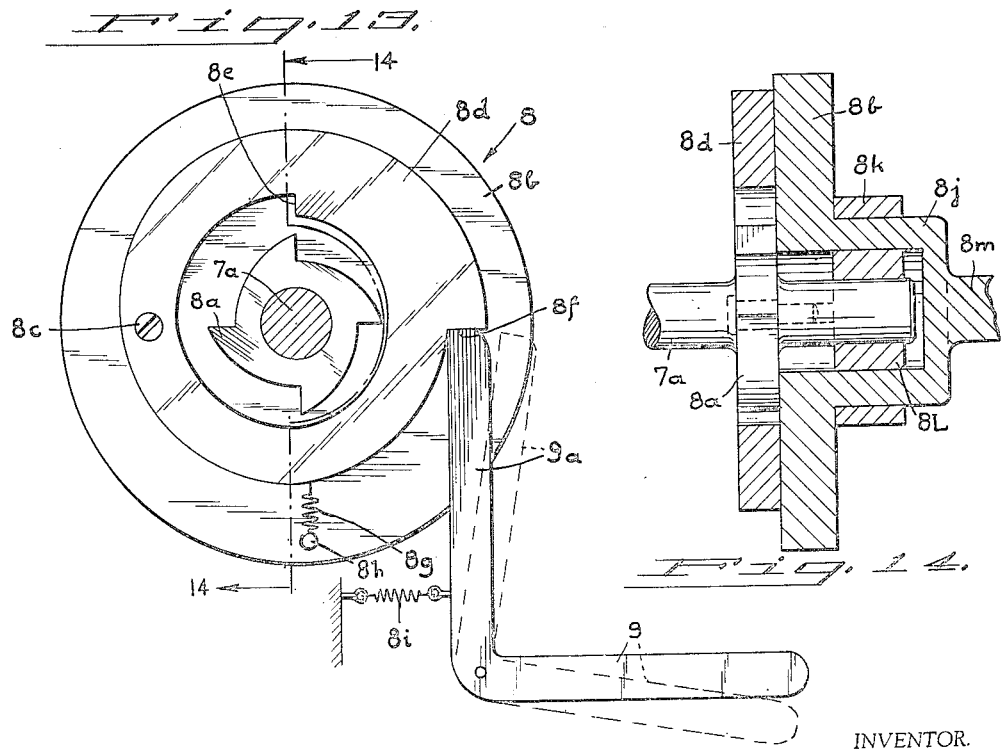

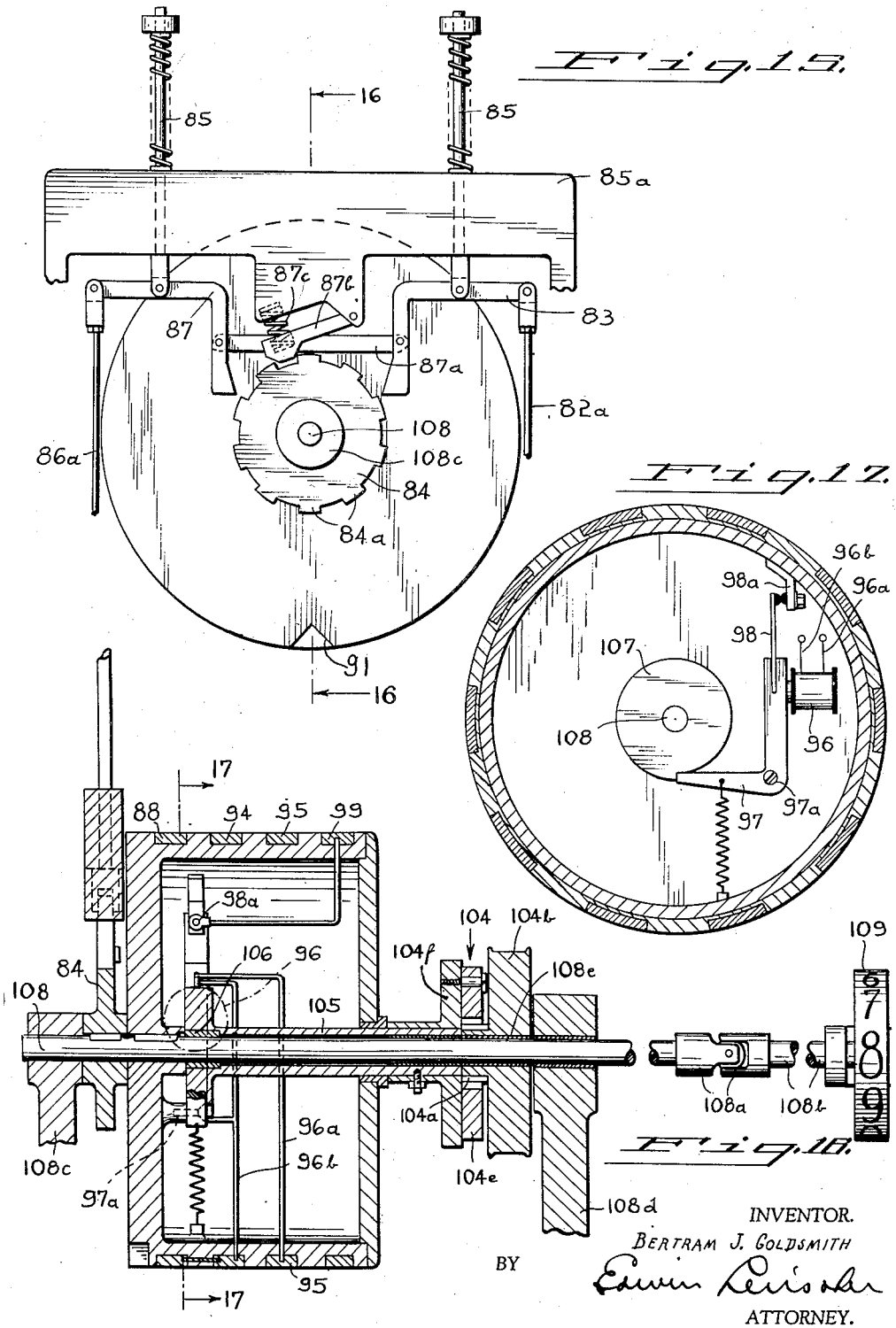

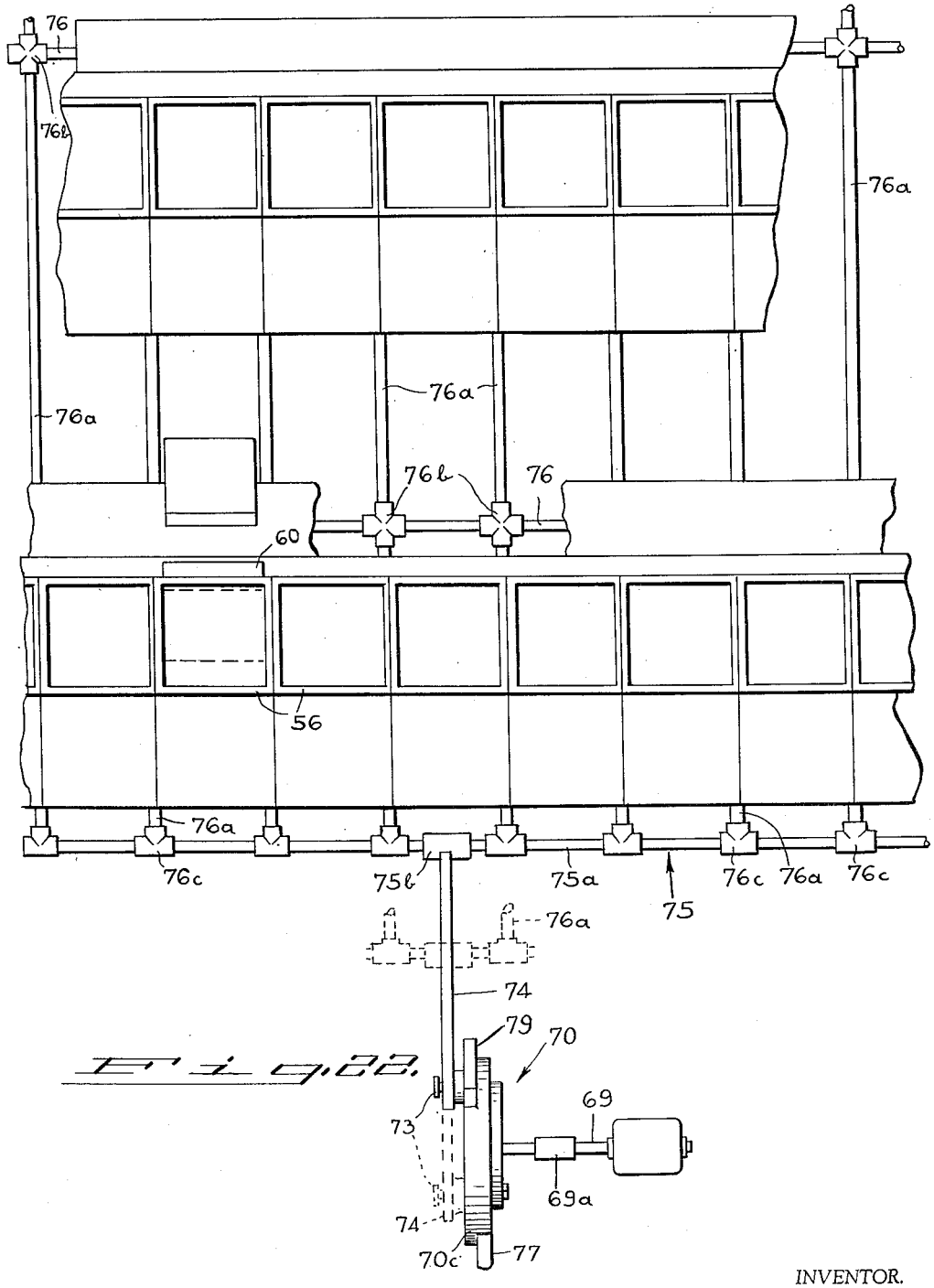

April 24, 1945. B. J. GOLDSMITH 2,374,537
AUTOMATIC ARTICLE SELECTING SYSTEM AND APPARATUS
Filed March 27, 1940 12 Sheets-Sheet 11
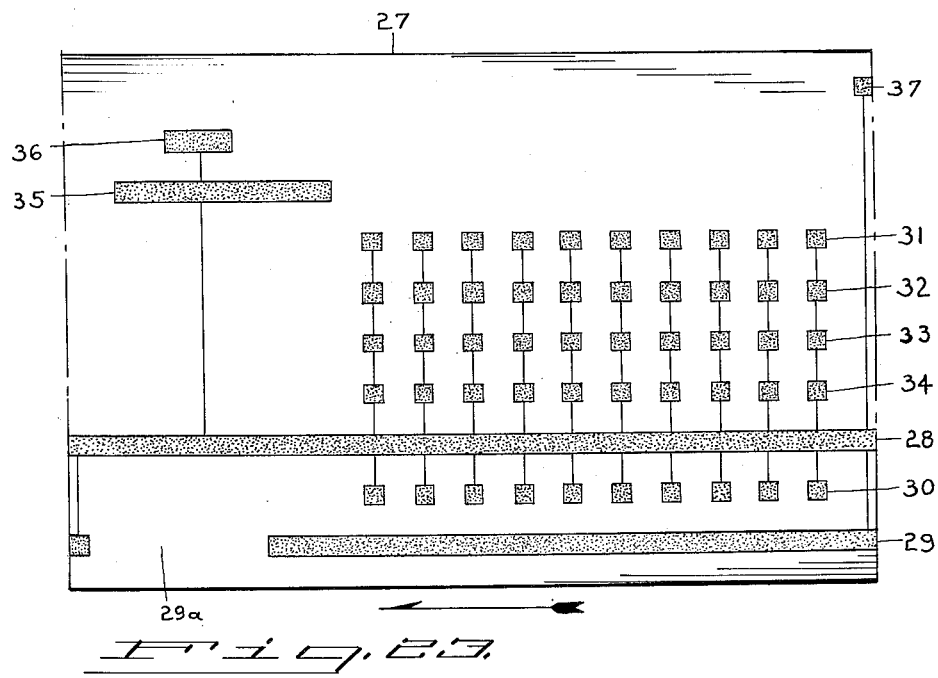
Fig. 23.
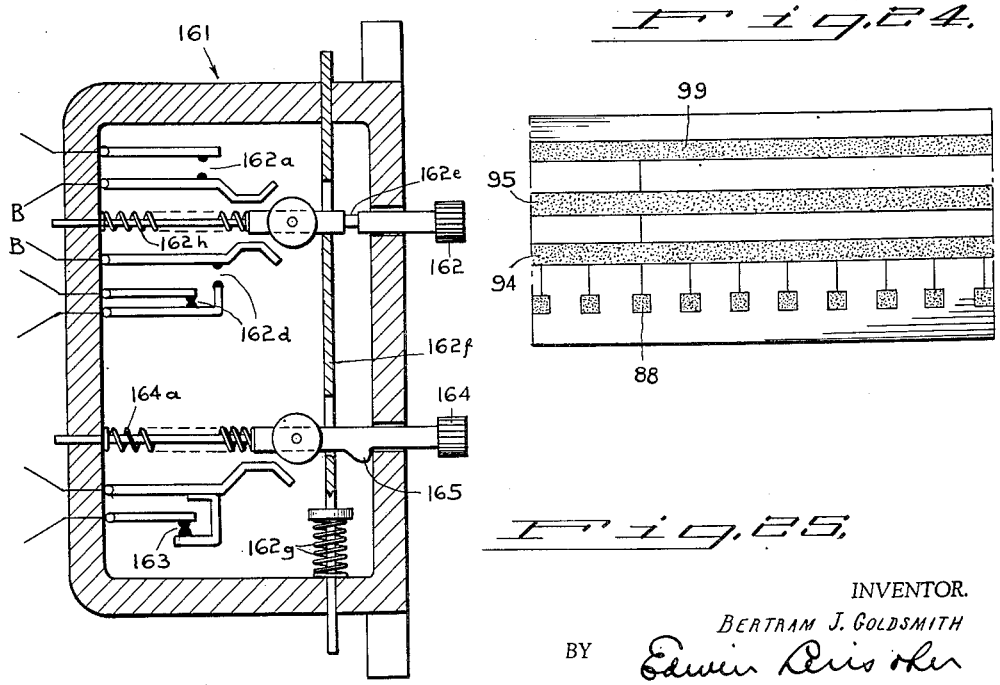
Fig. 24.
Fig. 25.
INVENTOR.
BERTRAM J. GOLDSMITH
BY
ATTORNEY.

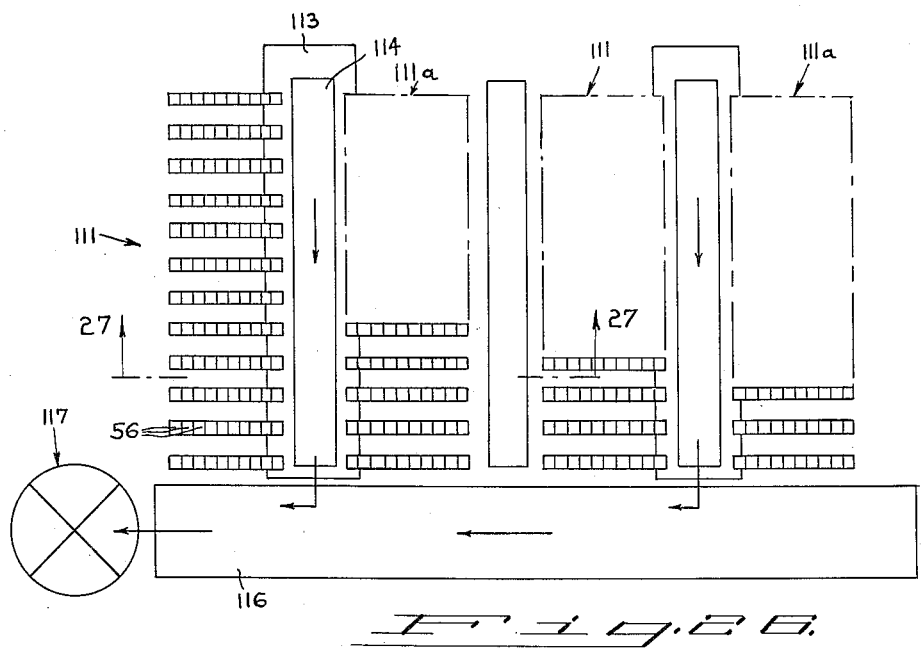
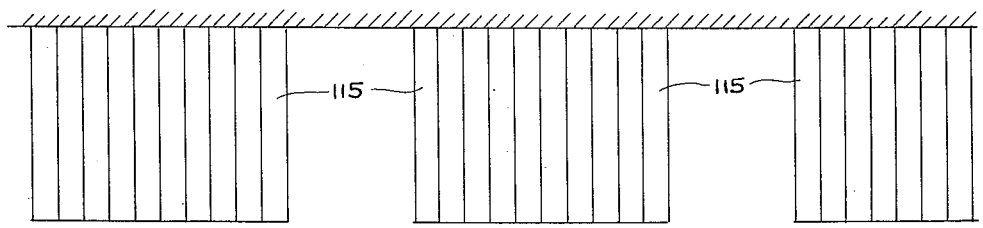
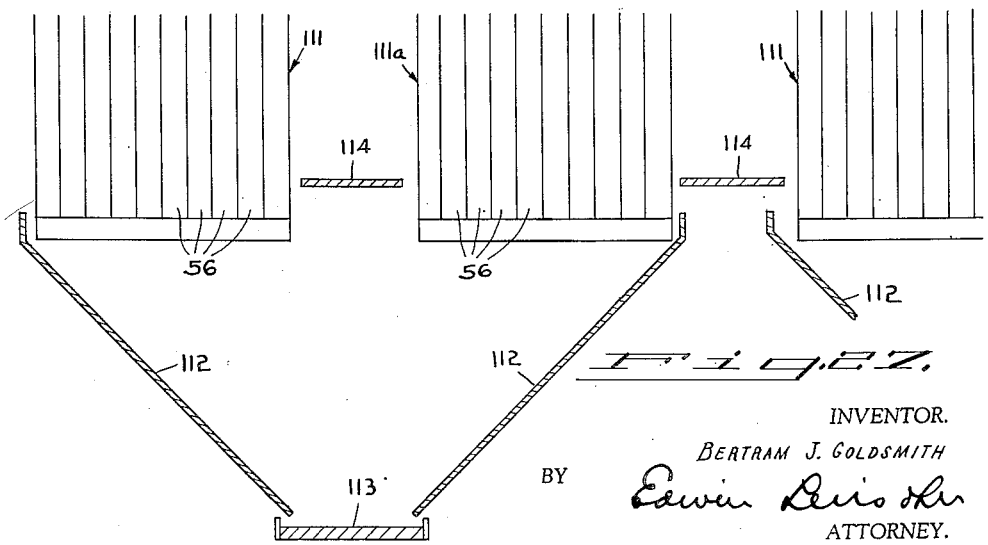

Patented Apr. 24, 1945

2,374,537

UNITED STATES PATENT OFFICE 2,374,537

AUTOMATIC ARTICLE SELECTING SYSTEM AND APPARATUS

Bertram J. Goldsmith, Neshanic, N. J., assignor to General Ribbon Mills, Inc., New York, N. Y., a corporation of Delaware Application March 27, 1940, Serial No. 326,237

44 Claims. (Cl. 234—1)

This invention relates to an automatic article picking system and apparatus and, more particularly, to such system and apparatus constructed and arranged to select and deliver predetermined articles in predetermined quantities from a series of containers in which the articles are held.

The apparatus of the present invention is intended primarily for use in filling orders for various articles of merchandise and for doing this automatically instead of by manual labor. More particularly, in accordance with the present invention numerous articles of merchandise are arranged in supply containers, and said articles are dispensed selectively and in predetermined quantities, as called for by the orders to be filled, and are transferred to a receiving station where they are assembled with other articles of the same order similarly dispensed in predetermined quantities from the selected containers. As the apparatus operates automatically to select the articles called for by the orders and delivers the selected articles to a receiving station, which may be remote from the points at which the article containers are located, the amount of labor required for filling orders is thus greatly reduced and furthermore since the apparatus operates automatically under the control of primary-selector means, as hereinafter pointed out, the possibility of the occurrence of errors in filling the orders is eliminated, thus obviating one of the disadvantages of picking the articles by hand.

The apparatus or system of the present invention is designed to be operated under the control of primary-selector means fabricated to have a self-identifying relation to the articles to be dispensed. As an example of such primary-selector self-identifying means, there can be utilized, in accordance with the present invention, any of the cards or other devices used in business machines of the electrical or mechanical type.

In accordance with a preferred specific embodiment of the present invention, the apparatus is designed to be operated by electric-impulse actuated devices under the control of selector cards or under the control of selectively operable manual means, and further in accordance with the preferred form of the invention the apparatus is designed so that it is responsive to control either by said selector cards or by said selectively operable manual means or by both said selector cards and said manually-actuated means. The selector cards may be of any suitable construction but I prefer to use punched cards similar to those utilized in business machines. Also, while the manually-actuated means for transmitting impulses may be any suitable means, I prefer to utilize a manually-actuated impulse-generating and delivering device similar to the dial actuated-impulse means utilized in automatic telephony.

In the apparatus of the present invention provision is made for indicating the failure of a sufficient supply of articles short of the required number, in the event of such deficiency of supply, and for that purpose to mark the corresponding selector cards and also to separate the latter from the selector cards the orders of which have been filled. Provision is also made for interrupting the operation of the apparatus and for sounding an alarm or signal in the event of a wrong cycle or abnormal operation of the apparatus as, for example, when non-selected articles are released from the container means or when more than the predetermined number of selected articles called for by the respective selector cards are released from the corresponding container means.

The ultimate object of the invention, which is to automatically deliver in predetermined quantities selected articles from container means therefor, and the objects of the invention ancillary to said ultimate object will be best understood from the following description considered with reference to the accompanying drawings, it being understood that the drawings are illustrative and more or less diagrammatic of the invention and the apparatus embodying the same and are therefore not to be considered in limitation of the invention.

In the drawings:

Fig. 1, which consists of four sections designated A, B, C, and D, respectively, on four separate sheets, is a more or less diagrammatic view, with parts in perspective, and partly in section, illustrating the system and apparatus of the invention;

Fig. 2 is a view partly in elevation and partly in section of parts shown in Fig. 1A which operate in conjunction with the selector cards;

Fig. 2A is a bottom perspective view of parts of the apparatus, illustrating the contact-brush mounting;

Fig. 3 is a sectional view on the line 3—3 of Fig. 2;

Fig. 4 is a sectional view on the line 4—4 of Fig. 3;

Fig. 5 is a sectional view on the line 5—5 of Fig. 2;

Fig. 6 is a view of one of the selector cards;

Fig. 7 is a side view of a solenoid-cam operated switching device;

Fig. 8 is an end view of the device shown in Fig. 7;

Fig. 9 is a side view illustrating more or less diagrammatically the arrangement of terminal bars utilized in the wiring system of the apparatus;

Fig. 10 is a top view of the terminal bars illustrated in Fig. 9;

Fig. 11 is a top view illustrating more or less diagrammatically the operating means for the selector switches utilized in the apparatus;

Fig. 12 is an end view of the swivel base mounted motor which operates the device for removing unfilled or incompletely filled selector cards;

Fig. 13 is a sectional view of a one-revolution clutch;

Fig. 14 is a sectional view on the line 14—14 of Fig. 13;

Fig. 15 is a front view of the article quantity counter;

Fig. 16 is a sectional view on the line 16—16 of Fig. 15;

Fig. 17 is a sectional view on the line 17—17 of Fig. 16;

Fig. 18 is a view, partly in elevation and partly in section, of the article-receiving turntable and of actuating and control parts associated therewith;

Fig. 19 is a side view of a solenoid operated device associated with each article container;

Fig. 20 is a top plan view of two of the devices shown in Fig. 19;

Fig. 21 is a view showing in section a one-revolution clutch for operating the ejector frame;

Fig. 22 is a top plan view, with parts broken away for the purpose of illustration, of a part of the ejector frame and associated article container means, showing also the one-revolution clutch for actuating the ejector frame;

Fig. 23 is a view showing a plan development of the commutator shown in Fig. 1A;

Fig. 24 is a view showing a plan development of the counter commutator shown in Fig. 1C;

Fig. 25 is a view of a switching device utilized in the dial controlled operation of the apparatus;

Fig. 26 is a plan view showing, more or less diagrammatically, the layout of the article supply container arrangement and the associated conveyor means for delivering articles ejected from the supply containers to the article receiving turntable;

Fig. 27 is a sectional view on the line 27—27 of Fig. 26.

As hereinbefore stated, the apparatus and system of the present invention is designed to be operable under the control of primary-selector means fabricated to have a self-identifying relation to the respective articles to be dispensed in predetermined quantities. In the form of the invention herein disclosed, said primary-selector self-identifying means are constituted by selector cards, preferably of the type utilized in standard business machines, either electrical or mechanical. As is well known, a card of this type is divided into fields constituted or defined by a section of the card on which one particular item of information appears. As shown in Fig. 6 of the drawings, a card of this type designated SC, which is adapted for use as a selector card for the purposes of the present invention has a field or column 1 for the order number, a field or column 2 for the month, a field or column 3 for the day of the month, a field or column 4 for the article or item container number, a field 5 for the quantity of articles or items to be picked or delivered in the operation of the apparatus under the control of this card and a field or column 6 which, when punched, indicates that that particular card represents the last card of the total order and is effective to clear the entire apparatus for the following order. It will be understood that only the last card of the group of cards of the same order will be provided with a punching or its equivalent in field 6. The parts or fields of the cards may be used for bookkeeping information or for any other purpose, it being understood that only fields 4 and 5 and in the case of the last card of the order, also field 6, are utilized in the control of the apparatus and the operation of the system. Thus, as here shown, field 4 is provided with punchings or openings 4a corresponding to the number 1,6,5,4, which is the number of the article or item container to be selected by this card. Field 5 has a punching 5a which indicates that 8 items from container 1,6,5,4, are called for. When field 6 is provided with a punching as indicated at 6a, said punching is always in the same place and as stated above indicates that the card having such punching is the last card of the total order and it will be understood that said punching 6a will control the operation of the apparatus whereby the latter is entirely cleared for the following order. The leading end of card SC is indicated at Le.

Referring now to Fig. 1A of the drawings, the electric motor 7, which rotates continuously, operates through reduction gearing to actuate, at a relatively low speed, a rotary shaft 7a which drives a one-revolution clutch 8 which is controlled by a one-revolution clutch latch lever 9 under the control of a solenoid 10 connected thereto by a link or rod 10a. Any suitable one-revolution clutch may be employed. As here shown (Figs. 13 and 14), said clutch comprises a toothed driving member 8a fixed to shaft 7a and rotated thereby, a driven member 8b having pivotally mounted thereon, as indicated at 8c, an annular coupling plate or latch 8d having an internal shoulder 8e and an external shoulder 8f arranged to engage toothed member 8a and release latch lever 9, respectively. Coupling plate 8d is biased to a position to engage either toothed member 8a or the free end of arm 9a of lever 9, for which purpose, a spring 8g is connected at one end to said coupling plate and at its other end to a pin 8h fixed to the driven member 8b. A spring 8i having one end connected to a fixed point is connected at its other end to lever arm 9a and biases said lever to the position shown in full lines in Fig. 13 for holding coupling plate 8d out of engagement with toothed member 8a. It will be understood that when solenoid 10 is energized, lever 9 is moved out of engagement with shoulder 8f of coupling plate 8d permitting the latter to move into engagement at its shoulder 8e with toothed member 8a, resulting in the rotation of driven member 8b. The arm 9a of lever 9 bears on the outer periphery of coupling plate 8d during the rotation of the latter with driven member 8b, and as the solenoid 10 is de-energized immediately after the driven member 8b starts to rotate, said arm 9a engages shoulder 8f of coupling member 8d at the end of one revolution of said member 8b, thus disengaging said member 8d from toothed member 8a. Said driven member 8b is provided with a hub 8j which is journalled for rotation in a bearing 8k and which has formed therein a bearing 8L for the end of shaft 7a.

Driven clutch member 8b has fixed thereto and actuates a driven shaft 8m which rotates a cam 11 which is preferably designed to drive its follower with uniformly accelerated and retarded motion. Said cam engages a cam follower or roller 12 fixed to a card feeder 13. Said card feeder 13 reciprocates in guides 13a on a support 13b, shown in Figs. 2 and 5 and is reciprocated by cam 11 in engagement with roller 12, a spring 13c holding said roller in engagement with said cam and also moving card feeder 13 to the retracted position thereof illustrated in Fig. 1A. For this purpose spring 13c is connected at one end to a fixed point and at its other end to said card feeder. Card feeder 13 is provided with fingers 14 and moves under a magazine or card chute 15 in which the selector cards are stacked (Fig. 2), said fingers being positioned to engage the rear edge of the lowermost card in chute 15, whereby to eject a single selector card from said magazine for movement with said card feeder 13 from retracted position to a projected position indicated at 16 in Fig. 1A. Selector cards SC are arranged in magazine 15 so that their leading edges Le will be at the left, viewing Fig. 1A. In passing to said projected position the selector card passes beneath a metal or electric-contact roller 17 and over a set of brushes 18, including a brush 18a. All of said brushes are carried by a brush lever 19 (Figs. 2 and 2A) pivoted on stationary support 13b as indicated at 19a. Said brushes extend through an opening 13d in the upper surface of support 13b and are biased to project through said opening by a spring 19b connected to brush lever 19 and to said support. The selector card in passing under roller 17 insulates the brushes from said roller except when the punchings 4a, 5a and 6a of fields 4, 5 and 6 (see Fig. 6) of the selector cards pass over said brushes. Brushes 18 are arranged to project only through the openings in fields 4 and 5, and brush 18a is arranged to project through only the opening 6a in field 6 which is provided in the last card of the order.

Provision is made for holding the brushes out of contact with roller 17 except during the passage of the selector cards under said roller. For this purpose, card feeder 13 has fixed to an inner side thereof, a cam 20 (Figs. 3 and 4) having a cam track 20a into which projects a roller 20b carried by a lever 21 pivoted on frame 13b at 21a and bearing on brush lever 19 as indicated at 21b. It will be understood that when lever 21 is raised by engagement of roller 20b in the uppermost part of cam track 20a, the brushes can contact roller 17 if permitted to the so by the punchings 4a, 5a and 6a. The length of the uppermost part of track 20a is determined by the field of the selector card SC having said punchings. During the remainder of the forward stroke the roller 20b is guided into the lower part 20c of the cam groove or track and remains there during the return stroke of card feeder 13, during which return stroke the latch 20d which is pivoted at 20e is lifted by he roller 20b which, thereupon, passes into the intermediate part 20f of the cam track. During the following forward stroke of card feeder 13 roller 20b rolls over latch 20d which thus holds said roller in said part 20f of the cam track in position to pass into the uppermost part thereof, as indicated in Fig. 4, which permits spring 19b to move the brush lever 19 and the brushes carried thereby into position to engage contact roller 17 for the length of the fields 4, 5 and 6 of the selector card SC.

The support 13b is provided forwardly of contact roller 17 with spring retaining members 22 which are depressed while the selector card moves over them but which act to prevent return movement of said selector card during the return movement of card feeder 13. Support 13b is also provided with a retaining spring 22a which holds the selector card SC in the projected position thereof. Said card is held between springs 22 and said spring 22a until the next forward stroke of the card feeder 13 when fingers 14a fixed to the top of card feeder 13 near the forward end thereof engages the rear edge of the previously projected selector card SC positioned between said springs 22 and 22a and moves the same into a receptacle therefor.

Card feeder 13 is provided at the undersurface of its spaced sides with racks 23 which engage and rotate pinions 24 fixed to a rotary shaft 24a mounted for rotation in support 13b. One end of shaft 24a has fixed thereto the driven member 25 of a one-direction clutch, the other member being indicated at 25a. A spring 25b holds clutch member 25 in engagement with clutch member 25a in one direction driving relation and permits disengagement of clutch member 25 from companion clutch member 25a in the opposite direction of rotation of clutch member 25. A spring-loaded retaining pawl 26 engages a member 26a which is in fixed relation to clutch member 25a to hold said clutch member stationary during the return stroke of card feeder 13. The gear ratio of racks 23 and pinions 24 is such that the clutch will make exactly one revolution during the forward stroke of said card feeder, the driven member 25a of said clutch remaining stationary and being held stationary by latch 26 during the return movement of said card feeder.

The apparatus includes means for providing and for transmitting electric pulses, under the control of the selector cards, to certain parts of the apparatus. Said means includes the commutator 27 which is rotated by the clutch member 25a during the forward stroke of card feeder 13, said clutch member being, for this purpose, fixed to or otherwise operatively connected to said commutator whereby the latter, as stated, is turned precisely one revolution during the forward stroke of card feeder 13, said commutator remaining stationary during the return stroke of the card feeder. A plan development of the commutator 27 is shown in Fig. 23. Said commutator comprises nine control sections and one collector ring 28 which supplies the commutator with current through a stationary brush connected to the electric current source. In the drawings, the source of current for operating the several electric devices is indicated by the letter B and it will be understood that this reference letter wherever used indicates that the part designated thereby is connected to the same source of current. Also in the drawings, the letter A is used to indicate that all parts having this letter applied thereto are connected to each other by a line extending therebetween at the points marked with said letter. Similarly, as the several parts of the completed apparatus are illustrated on different sheets of the drawings, the lines of the wiring diagram which have been marked with the same reference letters or numerals will be understood as connected to each other, respectively. The first control section 29 of commutator 27 interrupts an electric circuit while the counter, hereinafter described, is stepped up or turned in one direction, thereby preventing said counter from sending pulses which would operate the ejector mechanism, as will hereinafter more particularly appear. The contact segment of section 29 is connected to the collector ring 28. For convenience in reference, section 29 may be referred to as the item ejector interrupter section. The contact segment of this section has, therefore, a non-conducting gap 29a. The next section indicated at 30 supplies the counter with pulses to step it up to the predetermined number called for by the selector card SC and more particularly by the punching 5a in the field 5 of the selector card. This section 30 is therefore termed herein the counter quantity section of commutator 27, and has a plurality of contact segments, as indicated, all individually connected to collector ring 28. The sections 31, 32, 33 and 34 supply pulses over lines 31a, 32a, 33a and 34a and the contacts 38a and 38b of companion relays 38, respectively, (Figs. 1A and B) to stepping magnets of the selector switches hereinafter to be referred to more in detail and are therefore designated herein, respectively, as the unit item selector section, the 10's item selector section, the 100's item selector section and the 1000's item selector section. The contact segments of these sections are individually connected to collector ring 28. The section 35 of commutator 27 is herein designated for convenience as the item-chute or article-container solenoid section which sends a current over wire E and the selector switches to a solenoid which releasably connects or latches the ejector frame to the pusher or ejector member of the selected item container, as will hereinafter be described more or less in detail. The section 36 is herein designated as the item-ejector section as it sends a pulse over line 36a to complete the circuit of the ejector control mechanism for releasing the first of the selected articles after the selection thereof. Pulses to release the rest of the desired quantity in accordance with the punching on the selector card SC are thereafter sent by the counter, all as will hereinafter more fully appear. The section 37 is designated herein as the homing section and sends a pulse over line D to the five polarized relays 38 to home said relays. The contact segments of sections 35, 36 and 37 are individually connected to collector ring 28.

It will be understood that polarized relays 38 are normally closed and permit the pulses sent by sections 30 to 34, inclusive, to pass to the solenoid (hereinafter referred) for stepping up the counter and to the stepping magnets of the item selector switches but that as soon as a punching in the selector card SC permits the brushes 18 to engage the contact roller 17, a pulse is sent to the corresponding polarized relays, respectively, from said brushes over wires C which are connected to said brushes and to said relays 38 (Figs. 1A and B). At this time, commutator 27, card feeder 13, and brushes 18 are in such position that the first pulse position of commutator 27 corresponds to the first line of field 4 of the selector card when the latter is above the brushes. It will be understood that the engagement of brushes 18 with contact roller 17 results in interrupting the transmission of pulses from commutator 27 to the several parts of the apparatus supplied by said commutator with pulses.

It will be observed that line D (Figs. 1A and B) connects homing section 37 of commutator 27 with the windings of all polarized relays 38 so that after said relays are opened by the pulses sent over wire C, the pulse sent by section 37 over wire D to relays 38 is effective, as stated, to home or close said relays. This pulse is sent at the end of the revolution of commutator 27 which is at the end of the return stroke of card feeder 13.

The means for selecting the articles to be ejected and, hereinafter for convenience in reference, sometimes designated as the item selector, comprises a plurality of ten-step rotary selector switches, of the type which have their wipers off the contact segment or hank in their home position. These selector switches are shown in Fig. 1B and one of them, all being of the same construction, is shown more in detail together with its stepping and release magnets and mechanisms in Fig. 11. Referring first to Fig. 11, each selector switch comprises as here shown a stepping magnet 39 and a release magnet 40. The wiper or movable contact member 39a is fixed to and rotatable with a shaft 39b rotated by a ratchet 39c. Said ratchet 39c is rotated step by step by a pawl 39d which is pivoted at 39e and is normally held out of engagement with ratchet 39c by a spring 39f. When a pulse is sent to magnet 39, the armature of pawl 39d is attracted thereby to engage said pawl with ratchet 39c for moving the latter one step. This movement of ratchet 39c results in a step movement of wiper 39a in engagement with contact segment 39g of the switch and into electric contact engagement with the first of the selector switch terminals or contact buttons 39h. It will be noted that there are ten contact buttons 39h for, as hereinbefore stated, the selector switches are ten-step switches. The movement of wiper or movable contact member 39a of the switch to contact button-engaging position is resiliently opposed by a spring 39i. The releasing magnet 40 is arranged, when energized, to attract and thereby release a retaining pawl 40a which is held normally in engagement with the teeth of a ratchet 39c by a spring 40b. It will be understood that when releasing magnet 40 is energized, retaining pawl 40a is moved out of engagement with ratchet 39c and since stepping pawl 39d is normally out of engagement with said ratchet, spring 39i is effective to return the wiper or movable contact member 39a to off position as illustrated in Fig. 11. Each selector switch is provided with a set of "off normal" contact springs 41 arranged to open the circuit of said releasing magnet 40 when the wiper 39a reaches its off position. For this purpose, said wiper is provided with an extension 39j which engages one of the contact springs 41 for moving the same out of engagement with its companion spring thereby to interrupt the circuit through the release magnet, as illustrated in Fig. 11 when the wiper is in off position.

Referring now to Fig. 1B the 10's selector switch 42 has its terminal members or contact buttons 39h in series, respectively, with a plurality of unit switches 43, there being ten of said unit selector switches which select all units although, less than ten of said unit switches are illustrated to avoid crowding of the illustrative drawings. The wipers or movable contact members 39a of the unit selector switches 43 are mechanically connected or coupled in tandem by a link 43a for concurrent movement. The contact segments 39g of the unit selector switches are each connected to a contact button of the 10's selector switch 42. The contact buttons of the unit selector switches are connected to the horizontal terminal bars 44 mounted on a terminal board indicated schematically at 45. The ten terminals or contact buttons of the 1000's selector switch 46 are connected, respectively, in series with ten 100's selector switches 47. The wiper or movable contact members 39a of the 100's selector switches are arranged for concurrent movement and for that purpose are mechanically connected or coupled in tandem by a link 47a. As in the case of the illustration of the unit selector switches 43 less than the ten 100's selector switches are illustrated in order to avoid crowding of the drawings. Accordingly, it will be understood that the illustration in Fig. 1B of the unit selector switches and the 100's selector switches represents ten unit switches and ten 100's switches, respectively. The hundred terminals or contact buttons of the 100's selector switches are connected with their respective vertical terminal bars 48.

In Figs. 9 and 10 the arrangement of the terminal bars 44 and 48 is illustrated and it will be understood that these bars are electrically insulated from each other. The current supplied to the 10's selector switch 42 by the line E from the item chute solenoid section 35 of the commutator 27 passes from the selected terminal or contact buttons 39h of the 10's switch to the selected unit selector switch 43, then to a horizontal terminal bar 44 and from the latter over a wire 44a to a companion solenoid hereinafter to be more specifically referred to and described, and from the latter over a wire 48a to a companion vertical terminal bar 48, and from the latter to the selected 100's selector switch 47 and to the selected 1000's switch 46, thus completing the circuit, as the conductor segment 39g of the 1000's selector switch is connected to the current source B, as is the collector ring 28 which, as hereinbefore stated, supplies current to the contact segment 35. It will be understood that each one of the 100 horizontal wires 44 leading from the ten coupled switches 43 is connected to a companion terminal block, having 100 terminals, thus making up 100×100 or 10,000 terminals. The first terminal block represents 0 and connects all item solenoids 57 from 0 to 10,000 in steps of 100 which have a 0 for the unit cipher such as 0, 100, 200, 300, 400, 500, 600, 700, 800, 900, 1000, 1100 ... up to 9900, 10,000. The second terminal block represents 1 and connects all item solenoids 57 such as 1, 101, 201, 301, 401, 501, 601, 701, 801, 901, 1001, 1101 ... , up to 9801, 9901. The third terminal block represents 2, the next one 3 and the last one 99, each one connecting its respective item solenoid 57 as described above. The current in line E is thus directed through the one 10's switch 42 and the ten coupled unit switches 43 to all item solenoids 57 from 0 to 10,000, each horizontal terminal block connecting 100 item solenoids. The current returning from item solenoid 57 is directed into the right hundred through the vertical set of 10,000 terminals and their respective stepping switches, the ten coupled 100's switches 47 directing the current into the right hundred and the one 1000's stepping switch 46 directing said current into the right thousand. Thus the current will circulate through only one item solenoid 57 and actuate it, as determined by the punchings in section 4 of the selector card SC, there being four punchings corresponding, respectively, to selector switches 42, 43, 46 and 47.

Provision is made to interrupt the operation of the apparatus when the selector cards in the magazine 15 (Fig. 2) are exhausted. For this purpose, a metal plate 49 is placed on the top of the stack of the selector cards SC and moves downwardly with said stack as the cards are successively projected from the magazine in the operation of the apparatus. After the last card has been ejected from the magazine, said metal plate 49 makes contact with terminal members 49a which are connected with the current source B and by a wire 49b to a contact spring set 50 (Fig. 1A), said last mentioned spring set being normally open. The circuit containing terminals 49a and 50 is in series with a solenoid interrupter relay 51 which when energized opens the normally closed relay switch 51a thereby interrupting the circuit through the solenoid 10 thus preventing the release of latch 9 of the one-revolution clutch 8. This interruption of the apparatus under the control of contact plate 49, companion terminal members 49a, and terminal members 50, will take place shortly before a full stroke of the card feeder 13 has been completed. For this purpose cam 11 is provided with a pin projection 50a which engages a projection of the spring contact member 50b of the spring contact set 50 thus closing the contacts of said set. As will be explained hereinafter it might happen that an article released accidentally or unintentionally from its container would stop the entire apparatus. Accordingly, to again start the apparatus there is provided a two-position switch lever 52 which can be used for closing the circuit 52a through the solenoid 10 for sending a pulse to the solenoid for releasing the one-revolution clutch latch 9.

The brush 18a carried by brush lever 19 is effective to make contact with contact roller 17 when the punching 6a of the last selector card SC of the order is passed beneath said roller. When contact through punching 6a is thus established, between brush 18a and contact roller 17, a pulse is sent to the polarized time relay 54 (Fig. 1C) over the wire 54a which is connected to line F connected to brush 18a. Polarized time relay 54 operates the time delay relay 55 (Fig. 1C) which allows all items of a previous order to reach the item receiver before the apparatus is effective to select and deliver the articles of the next order. The manner in which this is accomplished under the control of time delay relay 55 will be hereinafter explained more in detail.

Referring now to Fig. 1D it will be understood that the articles to be selected and delivered in the operation of the present system and apparatus are contained in separate supply containers, one of said containers being shown in this part of the drawing and designated by the reference numeral 56. The articles here schematically shown as individual cartons or packages 56a are stacked in the supply container 56 therefor, and are ejected individually in succession from said container in predetermined quantities during the operation of the apparatus. The article selector solenoid 57 hereinbefore referred to in describing the operation of the selector switches is associated with its companion article supply container and is operable when said solenoid is energized to actuate the pivoted latch 58 which carries a hook 59 in position to releasably engage a projection or catch 59a on the article ejector pusher 60 which reciprocates at the outlet end of the container.

The construction and arrangement of the item solenoid 57 and the associated parts are also illustrated in Figs. 19 and 20. As here shown, said solenoid is carried by a bracket or frame 61 fixed to and movable with part of an ejector frame, the construction and operation of which will be hereinafter described, it being noted at this point, however, that the item solenoid 57 is reciprocated in such manner as to actuate pusher 60 to eject articles from its companion supply container and thereafter to move said pusher to retracted position. On the return stroke to retracted position, bracket 61 engages projection 59a and thus moves the pusher 60 to said position. The pivotal mounting for latch 58 is constituted by a pin 61a secured in bracket 61 between opposite sides 61b thereof. Said latch 58 is normally held out of engagement with catch 59a of the pusher 60 by a spring 61c. The end of latch 58 opposite the hooked end thereof is provided with an armature 59b which is attracted by the solenoid 57 when the latter is energized thereby engaging the hooked end 59 of latch 58 with the catch 59a of the article ejector pusher 60. At the start of the return stroke of solenoid frame 61, said spring disengages latch 58 from the companion pusher 60.

A magnetic spring contact set 62 is carried by solenoid mounting frame 61 and is disposed adjacent solenoid 57. A spring 62a of said magnetic spring set 62 is attracted by solenoid 57 when the latter is energized thus making one contact and breaking another of said set. An item feeler 63 is disposed adjacent the outlet opening of the supply container 56 in the path of the article ejected or released from the container. Said item feeler operates in conjunction with a spring contact set 64, item feeler 63 being depressed when an article is ejected from the supply container, to make one contact and break another of said set. Each supply container 56 is provided with a device for indicating when the supply of articles therein is becoming low or is exhausted. For this purpose a member 65 is arranged to project into the container 56 through an opening 65a therein at a suitable height above the bottom of the container. Member 65 has associated therewith a set of spring contacts 66 which are normally held in open position by the engagement of member 65 with the articles in container 56. However, when the supply of articles in said container diminishes so that they are below members 65, the latter is automatically projected through opening 65a whereby to close spring contacts 66 thereby to complete a circuit through the signal device 67 on the signal board indicated schematically at 68. Member 65 is carried by a spring strip 66a which also carries one of the contacts of set 66 and is urged by said strip 66a for passage through opening 65a. It will be understood that there is an item ejector solenoid 57 for each supply container 56 of which there may be several thousand, say ten thousand, in the apparatus having the selector switches in the number and arrangement described above.

The means for actuating the ejector pusher 60 of the selected article-containing means, after the connection of the latch 58 to the catch 59 of the ejector pusher 60, under the control of the selected item solenoid 57 will now be described, reference being had more particularly to Fig. 1D. The ejector actuating means comprises a motor-driven shaft 69 which operates a one-revolution clutch 70 shown in further detail in Fig. 21. A bearing for shaft 69 is indicated at 69a. As here shown, driving-shaft 69 operated by motor M has a toothed driving member 70a, a pivoted coupling plate or latch 70b, and a driven member 70c, which operate substantially in the same way as the toothed member 8a, coupling 8d and driven member 8b of the one-revolution clutch 8 illustrated in Fig. 13 and described above. The latch releasing lever 71 (Fig. 1D) of the one-revolution clutch 70 normally holds coupling plate 70b out of engagement with toothed member 70a in the same way as latch releasing lever 9 of clutch 8. Said releasing lever 71 is retracted by a solenoid 72. Driven member 70c of clutch 70 is provided with a crank pin 73, having pivotally connected thereto one end of a connecting rod 74. The other end of rod 74 is connected to the ejector frame 75, as shown in Fig. 1D and in Fig. 22. More particularly, rod 74 is pivotally connected to the end cross member 75a of ejector frame 75 by a coupling member 75b in which said rod is pivotally secured as by a pin 75c.

As will hereinafter be more specifically described, the article-containers are arranged in a plurality of rows. The ejector frame includes an ejector rod 76 for each row of article containers 56. All of the ejector rods 76 form part of frame 75 (Fig. 22) and are connected in a unitary structure by cross rods 76a and coupling members 76b, said cross rod 76a being connected to end rod 75a of the frame by coupling members 76c. The rods 75a, 76 and 76a of frame 75 are preferably tubular in order to reduce the weight of the frame. It will be understood that frame 75 is mounted for reciprocation as a unit below containers 56. The bases 61 for the item solenoids 57 are secured to rods 76 as illustrated in Fig. 19 and it will be understood that each rod 76 has secured thereto a plurality of solenoids 57, one for each article container 56. This is illustrated in Fig. 20 which shows a comparatively short length of rod 76 on which two item solenoids 57 are mounted by means of their respective mounting frames or bases 61.

The driven member 70c of ejector clutch 70 is provided with a cam 77 which, during revolution of said driven clutch member 70c, is effective to close switch 78 to transmit a pulse to cut the current previously supplied to solenoid 72. For this purpose switch 78 has an actuating pin 78a disposed in the path of cam 77. Switch 78 is a spring-loaded switch which automatically opens as soon as the pin 78a thereof is disengaged from cam 77. The driven member 70c of ejector clutch 70 is also provided with a cam 79, the function of which is to close the spring-loaded switches 80 and 81 having functions which will hereinafter be described. It will be understood that during the rotation of said driven member 70c, cam 79 engages the members 80a and 81a which are connected to the movable members of switches 80 and 81, respectively, (Fig. 1D), and that said switches are biased to the open positions thereof so that they open automatically when cam 79 disengages said members 80a and 81a.

After the ejector means has been operated to eject one article from the selected container in response to a pulse transmitted to solenoid 72 under the control of item ejection section 36 of commutator 27, the pulses to release the remaining quantity of the selected articles are sent under the control of the counter which will now be described with particular reference to Figs. 1C, 15 to 17 and 24. As stated above, the counter receives pulses from counter quantity section 30 of commutator 27. These pulses are transmitted to solenoid 82 over line G (Figs. 1A, 1B and 1C). The plunger of solenoid 82 is connected by means of a link 82a to a lever pawl 83 which is normally out of engagement with a companion ratchet wheel 84. Pawl lever 83 is pivotally mounted on and is carried by a spring-loaded plunger 85 slidably mounted in a stationary frame 85a. When solenoid 82 is energized, lever 83 is first pivoted on plunger 85 into engagement with ratchet wheel 84 and is then pulled down with said plunger whereby to turn said ratchet wheel one step in a clockwise direction, viewing Figs. 1C and 15. Ratchet wheel 84 has ten teeth 84a, so that each pull of the counter solenoid 82 is effective to turn said ratchet wheel one-tenth of a revolution in the clockwise direction. After the ratchet wheel has been moved a predetermined number of steps by the repeated actuation of the solenoid 82, and after the item ejector section 36 of commutator 27 sends the first pulse to release the first article from the selected article container 56, the item feeler 63 operated by the ejected item sends a pulse over the lines K and K1 (Fig. 1C and D) to the counter solenoid 86. This solenoid is connected by a link 86a to the counter pawl lever 87. Said pawl lever 87 is pivotally mounted between the ends thereof in the same way as pawl lever 83 on a spring-loaded plunger 85 which is mounted for sliding movement in frame 85a. Pawl lever 87 is normally out of engagement with ratchet wheel 84 and is operated in substantially the same way as pawl lever 83, i. e. it is first moved into engagement with the ratchet wheel and thereafter moved downwardly to rotate said ratchet wheel one step in a counter clockwise direction. Pawl levers 83 and 87 are connected by a link 87a so that only one of said pawl levers can engage the ratchet wheel at the same time, one of said pawl levers being moved away from the ratchet wheel when the other pawl lever is moved into engagement therewith. It will be understood that pawl lever 87 is effective upon each operation thereof to turn ratchet wheel 84 one-tenth of a revolution in a counterclockwise direction. Ratchet wheel 84 is held releasably against rotation by a pivoted latch 87b resiliently held in engagement with ratchet wheel 84 by a compression spring 87c.

The ratchet wheel 84 rotates the counter commutator 88. When said counter commutator is rotated anti-clockwise, a pulse will be sent at each step rotation thereof over line H, H1 to the polarized counter relay 89 (Fig. 1D) which will send a current to the ejector solenoid 72 over the wire I. Cam 77 of the driven member 70c of ejector clutch 70 will close switch 78 momentarily as stated above thereby sending a pulse to the polarized counter relay 89 over wire J thereby opening the circuit through solenoid 72. This cycle will continue until the counter returns to zero when a spring-loaded counter plunger 90 will be projected into a "zero" notch 91 in the periphery of the counter, thus operating a make-before-break contact set 92 (Fig. 1C) and a break-and-make spring contact set 93.

Referring to Fig. 24 which shows a plan development of the counter, it will be observed that the latter includes a collector ring 94 which supplies current to the contact segments of commutator 88. Said counter collector 94 also supplies current to the homing relay collector 95 which is connected to one side of the winding of said relay 96 by a wire 96a (Fig. 17), the other side of said winding being connected to collector ring 94 by a wire 96b. Relay 96 is mounted within and on the counter cylinder and rotates therewith. When relay 96 is energized it attracts the spring-loaded homing pawl 97, which is pivotally mounted at 97a on the counter cylinder (Fig. 17) whereby a normally open homing contact spring 98 will be closed, i. e., engaged with a contact 98a, thus completing a circuit with the counter homing solenoid collector 99 to energize a solenoid 100 (Fig. 1A) which is connected to collector ring 99 by a wire 100a which is connected to the companion brush 99a of said collector ring 99.

In the event that the selected item container does not contain a sufficient supply of articles called for by the selector card, the counter would not return to zero position. In that case a pulse is sent from the solenoid spring set 101 (Fig. 1A) as soon as the solenoid 102, connected to switch 81 by line M (Fig. 1A and D) is operated, to the homing relay collector 95 over wire 95a thereby to operate the homing relay 96. This results in the operation of homing pawl 97 for engaging contact 98 with contact 98a whereby a current will pass through the counter homing solenoid collector 99 to the counter one-revolution homing solenoid 100 over wire 100a thus pulling the releasing lever 103 of the homing one-revolution clutch 104.

Referring now to Fig. 16 in connection with Fig. 1A it will be noted that the driving toothed member 104a of clutch 104 is rotated by a belt driven pulley 104b driven by a belt 104c from the pulley 104d rotated by motor driven shaft 7a. The pivoted coupling member or latch 104e of clutch 104, when released by lever 103, couples toothed member 104a of clutch 104 with the driven member 104f of said clutch. Said driven member 104f is fixed to the counter sleeve 105 which is fixed to, as by a key 106 or in any other way, and rotates a one toothed wheel 107. The homing pawl 97 when attracted by relay solenoid 96 engages toothed wheel 107 which being fixed to the counter cylinder is effective to return the counter to zero, since counter sleeve 105 makes only one revolution when actuated by clutch 104. The counter shaft 108 which is keyed to the counter cylinder is rotated during the rotation of the counter by ratchet wheel 84 and is effective through the universal joint 108a to rotate the shaft 108b which rotates the printing wheel 109. It will be observed by reference to Fig. 16 that shaft 108 is journalled for rotation at the ends thereof in bearings 108c and 108d, and that clutch 104 including pulley 104b and driven member 104f is journalled for rotation on a bearing sleeve 108e on shaft 108. Printing wheel 109 is normally held out of engagement with the selector card SC in the projected position 16 thereof (Fig. 1A) and is engaged with said card to print thereon when the quantity of the selected articles in the supply container thereof is insufficient to supply the quantity called for by said selector card, thereby to print an indication on said card of the quantity supplied. The operation and control of said printing wheel 109 will be detailed later.

Referring now to Figs. 26 and 27 in connection with Fig. 22 and Fig. 1D, it will be observed that the article containers 56 are arranged in companion rows 111 and 111a. The articles ejected from the containers 56 in companion rows 111 and 111a of said containers are directed by inclined walls 112 to a branch endless conveyor 113. A platform 114 is disposed between companion rows 111 and 111a of article containers 56 to permit an attendant to fill the container with articles as required. For convenience, racks 115 are arranged over the rows of containers 56 and constitute means for storing articles which are to be placed in said containers 56. A main conveyor 116 (Fig. 26) and Fig. 1D delivers the articles supplied thereto by the branch conveyors 113 to the article-receiving station at which a turntable 117 is located.

Turntable 117 has four compartments 118, each of said compartments being provided for receiving all the articles of one order. As soon as a particular order is filled, turntable 117 is caused to rotate one-fourth of a revolution whereby to dispose another compartment in position to receive the next order delivered thereto by main conveyor 116. This article-receiving turntable 117 is rotated by a shaft 117a (Fig. 18) provided with a worm wheel 119 rotated by a worm gear 120 actuated by an electric motor 121. Provision is made for holding turntable 117 in stationary position and for permitting said turntable to rotate one-fourth of a revolution for the purpose of bringing the compartments 118 thereof into registry with main conveyor 116 as stated above. For this purpose said turntable is provided with four equally spaced recesses 122 in the underside thereof, and a retaining member or rod 123 is provided engaging the turntable in each of said recesses after thhe turntable has rotated one-fourth of a revolution. Said retaining member is slidably mounted in a guide 124 and is urged to projected position by a spring 124a. The lower end of retaining member 123 is connected to the turntable release solenoid 125 by a link 126. This solenoid receives its current over the line L from the time delay relay 55 (Fig. 1C), referred to above, so that after the last article of the order has been delivered to the turntable, releasing member 123 is moved out of engagement with its companion recess 122 thus permitting said turntable to rotate to bring the next compartment for receiving articles comprised in the next order. Motor 121 is energized when the normally open spring contact set 126a is closed by the closing member 126b carried downwardly by retaining member 123, when the latter is operated by solenoid 125, to release the turntable for rotation. Actuating member 126b in its downward movement engages one of the spring contact members of the spring set, thus closing the cricuit to motor 121. When solenoid 125 is de-energized under the control arrangement hereinafter described, spring 124a moves said member 126b out of engagement with the spring contact member thus permitting the latter to interrupt the circuit to motor 121, and at the same time the upper end of retaining member 123 is projected into the next recess 122 of the turntable thereby bringing the latter to a stop with a compartment 118 in position to receive articles of the next order from conveyor 116.

When all of the article called for by a particular selector card SC have been transferred to a compartment of the article-receiving turntable 117 the card which controlled the selection and delivery of the particular articles called for thereby and in the quantity specified by the card, is transferred to a turntable 127 (Fig. 1A) during the forward stroke of card feeder 13. When said card feeder operates to project the next selector card from the magazine 15 to the projected position 16 thereof, fingers 14a on said card feeder engage the card previously moved to the projected position and transfers the same to turntable 127 in a compartment 127a thereof corresponding to the compartment 118 of turntable 117 to which the articles called for by that card have been delivered. Accordingly, card-receiving turntable 127 is provided with four compartments 127a. Said card-receiving turntable is rotated synchronously with turntable 117. For accomplishing this, a sprocket wheel 128 is fixed to shaft 117a of turntable 117 and is connected by a sprocket chain 129 to a sprocket wheel 130 fixed to the shaft of turntable 127. Another turntable 131 (Fig. 1A) arranged to receive the cards, the articles of which have not been completely filled, is also rotated in synchronism with turntable 117. Said turntable 131 has four compartments 131a to correspond with the compartments 118 of turntable 117 so that when the articles supplied to a compartment 118 of compartment 117 do not correspond in number to that called for by the selector card, said selector card will be transferred to the corresponding compartment 131a of incomplete card turntable 131. Rotation of turntable 131 is effected by driving a sprocket wheel 131b of said turntable by the sprocket chain 131c which is driven by a sprocket wheel on the shaft of filled card turntable 127. Said turntables 117, 127 and 131 can be located near each other at the article-receiving station so that they can be observed together.

As described above, the printing wheel 109 is moved down into engagement with the unfilled selector card to print on the card the number at which the delivery of articles stopped. When the ejector pusher 60 moves to projected position but is ineffective to eject an article from the companion article container 56 selected by the particular selector card SC controlling the operation of the apparatus, a pulse is sent through switch 81 to the solenoid 102 over line M, as before stated, resulting in the printing operation of wheel 109. Said printing wheel 109 is carried by a lever 132 pivoted at one end thereof and resiliently held in retracted position by a spring 132a which opposes the downward pivotal movement of said lever by solenoid 102 and which moves said lever to retract printing wheel 109 from engagement with the selector card. Said lever 132 carries a finger 133 which, on movement of said lever, to retracted position, engages a spring contact set 134 thereby opening one circuit and closing another circuit in which said spring contact set is located as shown in Fig. 1A. When the circuit is closed current is sent to the motor 135 which, as will presently be described, is effective to operate a device to transfer the unfilled selector cards SC from the support 13b to the appropriate compartment of the unfilled-card receiving turntable 131. This current to the motor 135 is transmitted through the normally closed spring contacts 136 of the time delay relay 137. The opened circuit of the spring set 134 interrupts the current for the homing coil 138 of time delay relay 137 which releases the delay lever 139, and after a predetermined interval of time, which is necessary to deliver the unfilled selector card SC to the unfilled card turntable 131, engages a makebefore-break set of contact springs 140 to send a pulse over line R, R1, R2 (Fig. 1A and C) for operating the solenoid 10 associated with clutch 8. At the same time, the closed springs 136 are opened thus interrupting the flow of current to motor 135.

Motor 135 is effective to rotate a shaft 141 which carries wheels 141a which, when engaged with the selector card SC in the projected position thereof, are operable upon rotation to transfer said selector card to the unfilled selector card turntable 131. It will be understood that normally wheels 141a are out of engagement with the selector card SC and are brought into said engagement for moving the selector card off the support 13b and onto turntable 131 when the full number of articles called for by said card have not been supplied. For this purpose motor 135 is mounted on a base 135a, as illustrated in Fig. 12, pivoted at 135b on a support 135c. A compression spring 135d resiliently holds base 135a in raised position. When current is supplied to motor 135 for operating the delivery wheels 141a thereof, current is at the same time supplied to a solenoid 135e which is in parallel with the motor circuit, and when said solenoid is thus energized it is effective through the link 135f connected to swivel base 135a to move the latter downwardly and thereby to bring the delivery wheels 141a into engagement with the selector card so that when the motor rotates, the card is moved by said wheels from the support 13b to the registered compartment 131a of unfilled card turntable 131.

It will be observed that when lever 132 which carries printing wheel 109 is thereafter depressed into engagement with the next card, the order of which may be unfilled, the spring contacts of set 134 which are in the circuit with the winding 138 of time delay relay 137 will be closed thereby closing the circuit through said winding 138 so that lever 139 is attracted and is conditioned for the next delayed actuation of said spring contact set 140.

In the operation of the apparatus effective to completely fill the order called for by the particular selector card, as soon as the selector switches have completed the connection to the solenoid 57 of the selected article container 56 and as soon as the counter has been rotated or stepped up the required extent corresponding to the quantity of articles called for by the selector card, the item ejector section 36 of commutator 27 sends, over line 36a (Fig. 1A and D), a pulse which operates the polarized counter relay 89 which sends current to the solenoid 72 of the ejector clutch 70 thus releasing the latch 71 and permitting operation of ejector frame 75 through said clutch by motor driven shaft 69, thus operating the selected pusher ejector 60 to eject the first item from the companion article container 56. This article thus ejected depresses the item feeler member 63 and thereby closes the lower item feeler springs 64 so that a current is sent through the magnetic spring set 62 which is in the energized position thereof since the companion item solenoid 57 receives current from the item chute solenoid section 35 of commutator 27. This current passes by way of line K to a normally closed spring contact set 142 (Fig. 1C) which completes the circuit over line K1 to the counter solenoid 86 whereby said solenoid is energized and is operative through lever 87 to turn back the counter one-tenth of a revolution. While the counter is thus turned back a pulse is sent by the counter commutator 88 to the polarized counter relay 89 which then sends current over line I to solenoid 72 for the ejection of the next article. When the last article of the number called for by the selector card is ejected from the selected article container 56, the counter solenoid 86 makes its last stroke, the counter zero plunger 90 then engaging in the "zero" notch 91 of the counter. When said plunger 90 moves into notch 91 the make-before-break spring 92 receiving its current from the normally closed polarized time relay contact spring set 143 of relay 54 sends, over line R1, R2, a pulse to solenoid 10 which releases latch 9 of clutch 8 so that the next operation of cam 11 occurs for actuating card feeder 13 to project the next selector card. A circuit is closed by the make spring of the spring contact set 93, sending a current over line A—A (Fig. 1C and B) to all release magnets 40 of the selector switches, so that all of said selector switches are homed or returned to off position each time the zero position of the counter is reached, at which time, as hereinbefore stated, plunger 90 is received in counter notch 91. These operations are repeated for each selector card of the order until the last card of said order bearing the special punching 6a is projected from the magazine, at which time the brush 18a makes contact with the contact roller 17 and a pulse is thereupon sent, over line F and wire 54a, to the polarized time relay 54. When this pulse is sent to relay 54 the current of the polarized time relay spring 143 is interrupted, as the lever 54b of relay 54 engages the end of one of the springs of the spring set 143 (as shown in Fig. 1C) and moves the same away from its companion spring and interrupts the circuit to solenoid 10 and interrupts the flow of current from the break spring of the break-and-make spring set 93, over the polarized time relay 54 to the winding of the time delay relay 55. As the winding of relay 55 is now de-energized lever 144 moves slowly toward normally open spring contact set 145 and closes the circuit, including the winding of relay 54, of this spring contact set. A dash pot or delay device of any suitable construction is provided for obtaining the desired time interval of the movement of lever 144 to close said contact set 145. As here shown, this timing device includes a piston 146 connected to pivoted lever 144 and urged by spring 147 which is connected to said lever inwardly of cylinder 148. The escapement of air from cylinder 148 is regulated by a needle valve 149. Cylinder 148 is also provided with an air intake valve 150 which admits air into the cylinder when piston 146 makes its return stroke upon the next energization of the coil of the solenoid of relay 55.

During the time lever 144 is moving toward spring contact set 145 for closing the same the articles on the main conveyor 113 are delivered to the article-receiving station or turntable 117. A spring contact set 145a is associated with spring contact set 145 and is closed by a pin 145b carried by one of the spring contact members of set 145 so that spring contact set 145a closes when the spring contact set 145 is closed by time delay relay lever 144. The spring contact set 145a controls the circuit of solenoid 125 (Fig. 18) which, as explained above, controls the starting and stopping of motor 121 of turntable 117. The closing of the spring contact set 145 permits a current to pass to the polarized time relay 54 thereby homing it so that a current flows to solenoid 10 to release the latch 9 of clutch 8 whereby cam 11 is operated to actuate card feeder 13 for the next item of the order. Also, time delay relay 55 is energized, thereby loading it for the next release.

In the event that during any operation of the apparatus under the control of a selector card SC the order called for by said card cannot be filled because of an insufficient supply of articles in the supply container having the selected articles therein, printing wheel 109 will be actuated to mark the card and motor 135 will also be actuated, as described above, to deliver the unfilled card to the unfilled card turntable 131. In this connection it will be observed that if a pulse is sent to the polarized counter relay 89 in order to send a current to the ejector solenoid 72 for releasing latch lever 71 to permit clutch 70 to actuate the ejector frame 75 and if upon such actuation of the ejector frame, the pusher 60 is ineffective to discharge an article from the companion selected container 56, a circuit is completed over line M through solenoid 102 of printing wheel 109 by the normally closed contacts of the item feeler springs 64 (Fig. 1D) and by the incomplete spring switch 81 operated by cam 79, which is timed so that it actuates switch 81 to keep the latter closed only during an interval of time during which an article would, during the release thereof from container 56, depress item feeler 63. As hereinbefore described, printing wheel 109 is depressed and marks on the selector card the number at which release of articles failed and immediately thereafter the unfilled card is transferred to turntable 131 by motor operated wheels 141a.

As hereinbefore stated, it might happen that during the operation of the apparatus the latch 58 of a previously selected or of a non-selected article container 56 fails to release the ejector pusher 60, thus resulting in the discharge of unselected articles. If this occurs the item feeler 63 of the undesired article container is depressed closing the normally open or lower contacts of spring contact set 64. This results in a current being sent from said lower contacts of spring contact set 64 to the lower contacts of spring contact set 62, as these lower contacts are closed, companion item solenoid 57 being de-energized, and the current passes to the "wrong" spring switch 80 which is operated by cam 79. The current passes through switch 80 to the signal device 151 (Fig. 1C) over line N. Current also passes from switch 80 over line N, N1, to polarized relay 152 which interrupts the circuit to solenoid 10 thus stopping the operation of card feeder 13. Relay 152 is also operable through lever 152a to open normally closed spring contact set 152b which interrupts the circuit through the motor 153 (Fig. 1D) which drives the main conveyor 116 which is preferably intergeared with branch conveyors 113, thus stopping the apparatus entirely. The circuit from spring contact set 152b to motor 153 is indicated at O (Figs. 1C and 1D). A push button indicated at 153a (Fig. 1C) is provided for resetting lever 152a of relay 152 after the trouble which gave rise to the stopping of the apparatus is obviated.

In accordance with the present invention provision is made for operating the apparatus under the control of manually-actuated means which may be utilized supplementary to or in lieu of the selector cards. The manually-actuated control means may be utilized, for example, when a particular order is not large enough to justify the provision of selector cards, or when for some other reason it is desired to dispense with selector cards. The manually-actuated means may be of any suitable type but preferably as hereinbefore stated there is utilized a manually-actuated impulse-generating device such as the dial controlled device utilized in automatic telephony. Thus, referring now more particularly to Fig. 1B of the drawings there is shown a dial impulse device 154. As soon as the rotary finger plate of this device is moved a cam 155 operates a make-and-break spring contact set 156 sending a current over wire 156a to the stepping magnet 39 of selector switch 157, thus moving the movable contact member 39a of this switch from the off or home position to the first terminal or contact button thereby connecting the counter solenoid 82 with pulse-spring contact set 158, over wire 158a, contact segment 39g of the switch, and over line G. As soon as the dial plate is released the latter returns to its initial position during which time the pulses are generated, the pulse spring contact set 158 being actuated by the pulse cam 159 which is geared with the plate of dial 154. The pulses are delivered to the counter solenoid 82 thus rotating the counter in accordance with the quantity of articles desired. Current is also sent from the make-and-break spring 156 over line P to the interruptor relay 160 which interrupts the circuit H, H1 from counter commutator to the polarized counter relay 89, thereby preventing ejector solenoid 72 from being operated while the counter is rotated by solenoid 82 to condition the counter for the desired quantity of articles. In this connection, it will be understood that the counter commutator 88 sends pulses if rotated in either direction while on the other hand the only pulses which should be permitted to reach the ejector solenoid 72 are those generated during the rotation of the counter in the counter-clockwise direction. It will also be understood that if selector cards are used for operating the apparatus, the interruptor relay 160 will be operated during the rotation of the counter by solenoid 82, as this relay is connected to section 29 of commutator 27, it being understood that this section of commutator 27 sends a current over wire P1 while the counter is turned clockwise.

Upon the next turning movement of the plate of dial 154 stepping magnet 39 moves the movable contact member 39a of the switch 157 to the second contact position, thus making contact with the circuit of unit selector switch 43. The pulses of the second dialing transmitted upon the return movement of the dial plate through pulsing springs 158 will set all the unit selector switches 43 on the dialed contact. The third dialing will set the tens selector switch 42, the fourth dialing will set all the hundreds selector switches 47, and the fifth dialing will set all the thousandths selector switches 46.

After the operation of dial device 154 to select the article container from which the articles are to be ejected and after rotating or winding the counter in accordance with the predetermined number of selected articles, current is supplied to the selected item solenoid 57 and a pulse is sent to the polarized counter relay 89 homing the latter to permit pulses to be delivered from the counter to the ejector solenoid 72. For this purpose there is utilized a push key strip device 161 illustrated diagrammatically in Fig. 1B and shown in more detail as to structure in Fig. 25. When key 162 of device 161 is pushed inwardly to operate the companion spring contact set, contacts 162a are closed to permit current to flow from the current source B over the wires 162b and 162c to line E and over line E to the selector switches and by way of said selector switches to the selected item solenoid 57. The make-before-break spring contact set 162d controlled by push key 162 sends a pulse through the normally closed break spring contacts 163 over the wire 163a to the polarized counter relay 89, to close circuit I whereby to operate the ejector solenoid 72 for accomplishing the actuation of ejector frame 75 for releasing the first article. Thereafter, as explained above in the operation of the device under the control of the selector cards, the pulses for effecting the remaining number of operations of ejector frame 75, corresponding to the remaining number of articles to be ejected, are derived from the counter under the operation of solenoid 86, until the plunger 90 moves into the "zero" notch 91, the cycle being completed in the same way as described above in the operation of the apparatus under the control of the selector cards.

Upon the delivery of the last of the selected articles from the container 56, a reset push key 164 provided in the push key strip device 161 is operated. Referring now to Fig. 25 in connection with Fig. 1B which illustrates push key strip device 161, it will be noted that provision is made for releasably retaining push key 162 in projected position. Thus as here shown the stem of said push key is provided with a peripheral notch 162e in which a retaining member 162f is engaged, being urged to said engaging position by a spring 162g. Reset push key 164 is utilized for releasing push key 162. The stem of push key 164 is provided with a cam 165 to engage retaining member 162f for moving the same against spring 162g, thereby to release push key 162 from member 162f whereupon said push key is moved by spring 162h to retracted position. The stem of push key 164 is similarly moved by a spring 164a to retracted position.

When the last articles of the same order are to be supplied the push key device 161 is not operated but instead there is utilized another push key strip device 166 which is of the same construction as the push key strip device 161 illustrated in Fig. 25. The make-and-make-before-break push key 167 of this device, which push key corresponds to the make-and-make-before-break push key 162 of device 161 is operated to close the contacts 167a thereby to send current from the current source over the wire 162c and line E to the selector switches and from the latter to the selected item solenoid 57. At the same time a pulse is sent through the make-before-break contacts 167b from the current source and over the normally closed contacts 167c over the line 167d which connects with line 163a to the polarized counter relay 89 which in turn operates the ejector solenoid 72 for actuation of ejector frame 75 to release the first article of the predetermined number required. Another pulse is sent to the polarized time relay 54 from the source over the make-before-break contacts 167b over wire 167d. The pulse sent to time relay 54 operates the time delay relay 55 thereby allowing the last item to arrive at the item turntable 117 before the next order is dialed. Otherwise the cycle is the same as described in connection with push key strip device 161. The reset push key 168 operates in the same way as reset push key 164 to release push key 167 for movement to retracted position and permitting the spring contacts 167c to open thus interrupting the circuit to the polarized counter relay 89.

While the operation of the apparatus has been described above in detail, a more general description of the operation of the apparatus will now be given. First, it will be understood that the selector cards are prepared to correspond to the articles to be selected and to the number of said articles, and ordinarily one order will require a plurality of cards since each card relates to one particular kind of article. The selector cards which have been prepared or prefabricated to have an identifying relation to the respective articles to be dispensed in predetermined quantities thereof, respectively, are placed in the magazine 15 and are moved in succession from said magazine by the card feeder 13 to a position beyond the contact roller 17. The card feeder 13 is reciprocated by cam 11 which is operated by the one-revolution clutch 8 driven by the electric motor 7 under the control of the releasing solenoid 10. During each card-feeding movement, the commutator 27 makes exactly one revolution, said commutator being stationary during the return movement of the card feeder. During the feeding movement of the card feeder and the corresponding movement of the commutator, pulses are sent to the operating magnets of the selector switches which operate to connect the selected solenoid 57 associated with each supply container 56 in the circuit, and said solenoid 57 is energized by current received from section 35 of commutator 27, whereby the armature lever 58 of the energized solenoid is projected for engagement with the article ejector pusher 60 of the associated supply container 56, when frame 76 is moved from its retracted position to its projected position. Also, during said movement of card feeder 13 pulses are sent from section 30 of commutator 27 to the counter, Fig. 1C, for turning the latter a predetermined distance clockwise depending upon the number of articles called for by the particular selector card then being fed forward by card feeder 13. As soon as the particular supply container 56 has been selected or in other words, as soon as the solenoid 57 associated with said container has been energized a pulse is sent from section 36 of commutator 27 to relay 89 and from the latter to solenoid 72 which releases the one-revolution clutch 70 for operating frame 75 thereby moving said frame from a retracted position to a projected position and return. During said movement of frame 75 to its projected position the armature lever 58 of the energized solenoid 57 engages the companion article-ejector pusher 60 and moves the same to discharge one of the articles from the selected container. As this article is discharged from the container, it depresses the item feeler 63 which controls the supply of current to the stepping solenoid 86 of the counter whereby to turn said counter one step in a counter-clockwise direction. While the counter is thus turned back one step, a pulse is sent from the counter commutator section 88 to relay 89 and from the latter to solenoid 72 for again releasing the one-revolution clutch 70 for operating frame 75 for the next actuation of ejector pusher 60 whereby to discharge the next article. When the last article called for by the particular selector card is discharged the solenoid 86 makes its last operation for returning the counter to its initial position. Card feeder 13 is then operated for feeding the next card of the selector cards in the particular order and the sequence of operation just described is repeated for each card in said group of cards. It will be understood that as the articles are discharged from the selected container they are moved by conveyors 113 and 116 to the receiving station at which the article receiving turntable 117 is positioned.

When the last article called for by the last selector card of the group is discharged from the container a pulse is sent from brush 18a to relay 54 which controls the time delay relay 55, in the manner described above, for delaying the next operation of the card feeder until all of the articles of the particular order are transferred by conveyors 113 and 116 to the corresponding compartment of the receiver 117. Then, said receiver is rotated to bring the next unoccupied compartment into line with conveyor 116, and the filled card receiver 127 is similarly rotated for bringing the next compartment of said receiver into line for receiving the "filled" selector cards of the next order group. Then the operation of the apparatus for filling the next order corresponding to the next group of cards occurs.

As described above, in the event that the predetermined number of articles called for by any particular selector card is not supplied, the item feeler 63 will not be actuated, and under this condition printing roller 109 will be depressed into engagement with the corresponding selector card, and thereafter said card will be moved by rollers 141a to the compartment of the "unfilled" card receiving turntable 131. It should be noted that printing roller 109 is turned one step backward from a predetermined position for each article discharged, as described in detail above, so that at the time said roller is depressed, an indication is printed on the card corresponding to the number of articles supplied, if less than the quantity of articles called for by said card. Also, as described above when the quantity of articles called for by the card is not supplied the one-revolution clutch associated with said counter is operated to return the latter to its initial position, after which card feeder 13 is operated for feeding the next card of the order group.

In the event that, as explained above, articles not called for by the particular selector card are discharged, which might occur, for example, when one of the armature levers 58 of a non-energized solenoid does not move to retracted position, provision is made for stopping the operation of the card feeder 13 and the movement of the conveyor 116. After the trouble has been located and remedied, push button 153a is actuated for resetting relay 152, as described above so that the normal operation of the apparatus can be resumed.

As described above in detail, the apparatus of the present invention has integrated therewith a dial control which is operated in lieu of or in addition to the selector-card control. Thus the apparatus is operable alternatively either under the control of prefabricated means such as, for example, selector-cards or under the control of a manually operated dial, but it will be observed that both controls are integrated in the apparatus so that one or the other can be used as desired. In this connection it will be understood, however, that the apparatus is primarily intended to be operated under the control of prefabricated primary-selector means, such as selector cards having a self-identifying relation to the articles to be picked in filling the orders, but in accordance with the present invention provision has been made for taking care of situations which might arise in actual practice where it is not feasible or efficient to use selector cards for controlling the apparatus, for example, in a case such as that hereinbefore mentioned when a particular order is not large enough to justify the preparation of the selector cards or where one or more particular articles are required in a hurry or under some other condition which would not justify the preparation of the selector cards or the time required to prepare the same.

While certain of the devices utilized in the present system and apparatus have been described more or less specifically, it will be understood that this has been done primarily for the purpose of explaining the invention and that in lieu of the devices thus specifically described other devices having similar functions can be utilized. For example, the selector switches while specifically described with reference to the stepping and release magnets and associated mechanism can be selector switches of any other suitable type. Another example of the use of other devices than those described above for accomplishing certain results in applicant's system is that in lieu of the polarized relays 38 there may be utilized a solenoid-cam actuated switch 170 illustrated in Figs. 7 and 8, it being understood that each polarized relay 38 can be replaced by a switch 170. This switch, as here shown, comprises a base 171 having upstanding parts 172 and 173 in which a shaft 174 is journalled for rotation. One end of shaft 174 has fixed thereto a ratchet wheel 175 which is operated by a pawl 176 carried by a pawl lever 177 pivoted at 178 on the upstanding end portion 179 of base 171. Said lever is actuated by a solenoid 180 mounted on base 171. A spring 181 connected at one end thereof to base 171 and at the other end thereof to pawl lever 177 normally holds said lever in retracted position, a stop member 182 formed at the upper end of part 179 serving to limit the movement of pawl lever 177 to said retracted position thereof. A cam 183 is fixed to and is rotated by shaft 174. Spring contact members 184 and 185 and an operating spring 186 are each fixed at one end thereof to a part 187 upstanding from base 171 and are disposed for actuation under the control of cam 183. When solenoid 180 is energized, the pawl lever 177 is attracted and operates pawl 176 thereby to turn ratchet wheel 175 and cam 183 one-eighth of a revolution, there being eight teeth on said ratchet wheel. The lower spring member 186 which has a bent portion 188 in engagement with the cam is raised from the recess between the adjacent teeth of the cam and engages the pin 189 carried by upper spring contact member 184 thereby disengaging contact 184a carried by said member from its companion contact 185a carried by spring contact member 185. The next one-eighth of a turn of cam 183 will result in the lowering of spring 186, its portion 188 engaging in the recess between the next two adjacent teeth of the cam, whereupon contacts 184 and 185 will again be in engagement.

A stop member 190 is fixed to pawl lever 177, as by rivets 191 or in any other suitable way, and moves with said pawl lever to limit the downward movement thereof so that the pawl carried thereby is actuated to move cam 183 exactly one-eighth of a turn, the companion stop 192 for said stop member 190 being here shown as constituted by a lateral extension as part of 172. Pawl 176 is connected to pawl lever 177 by a pin 193 secured to said pawl lever and passing through said pawl. Pawl 176 is movable on said pin 193, and a spring 194 bearing on said pawl and against an abutment member 195 fixed to the end of said pin holds pawl 176 firmly but releasably in operative engagement with lever 177. The terminals of contact springs 184 and 185 are indicated at 184b and 185b, respectively, and correspond to the contact members 38a and 38b, respectively, of polarized relay 38. The solenoid 180 has its winding connected at one end thereof to the source of current B in the same way as the winding of the polarized relays 38 and at the other end thereof has a terminal 180a which is connected to its respective brush 18. Polarized relays 54, 89 and 152 can also each be replaced by a switch 170 provided with additional contact members where necessary.

Another example of the use of devices of various kinds in the apparatus and system of the present invention is afforded in respect to the spring switches 78, 80 and 81. Thus, these switches are spring-loaded switches of any suitable type so that they are closed momentarily and opened automatically, switches known as "micro" switches being preferred for this purpose, although any other switches which operate in the same or similar way can be used. It will be understood that the examples here given for the substitution of one device for another in the present system and apparatus are not exhaustive of the changes which can be made in the apparatus herein illustrated or described. Also, it will be understood that while I have shown and described the preferred embodiment of my invention, and have indicated the use in connection therewith of several different types of devices, it will be understood that my invention may be embodied and practiced in other ways than herein specifically disclosed. Accordingly, I do not wish to be limited specifically to the present disclosure, or to any of the modifications herein referred to, except to the extent which may be required by the scope of the present claims.

Having thus described my invention, what I claim and desire to secure by Letters Patent is:

1. The combination with container-means for different articles to be discharged therefrom, of apparatus including means operable selectively to cause the discharge of predetermined numbers of selected articles, respectively, from said container-means, means for selectively operating said article-discharge means, means effective in one operation of the apparatus to actuate the selected discharge operating means a predetermined number of times whereby to discharge a predetermined number of articles of one kind, and means operable under the control of the discharged articles of one kind to initiate the next operation of said apparatus whereby to discharge a predetermined number of different articles.

2. The combination with a plurality of containers for articles to be dispensed, of a member for each container for ejecting the articles therefrom, means for operating said ejecting members selectively comprising a frame movable in relation to said containers and provided with a plurality of members adapted to be operatively connected to said ejecting members, respectively, impulse-actuated means for selecting the ejecting member to be operated by said operating means, and means automatically operable upon the selection of the ejecting member to be operated by said operating means to actuate the latter a predetermined number of times for operating said ejecting member.

3. In automatic article-picking apparatus having container-means for the articles to be picked, the combination with means to cause articles to be discharged from said container-means selectively and in predetermined quantities, respectively, of means for actuating said discharge means, electric impulse-actuated means for controlling the operation of said actuating means, means for supplying electric impulses to said control means, and means operable at least in part under the control of the discharged articles for controlling the supply of impulses to said impulse-actuated means.

4. The combination with container-means for holding articles to be discharged therefrom, of means operable a predetermined number of times to effect the discharge of a predetermined number of articles from said container means, said discharge effecting means being actuated under the control of electric-impulses, means for supplying electric-impulses for providing said control including a rotary commutator and means operable to rotate said commutator in either of two directions including means to rotate said commutator step by step in one of said directions, means operable under the control of the articles discharged from said container-means to operate said means for rotating said commutator step by step in said one direction, and means for preventing the supply of pulses to said discharge means when said commutator is rotated in the other direction.

5. The combination with container-means for holding articles to be discharged therefrom, of means operable a predetermined number of times to effect the discharge of a predetermined number of articles from said container means, said discharge effecting means being actuated under the control of electric-impulses, means for supplying electric-impulses for providing said control including a rotary commutator, and means operable to rotate said commutator in either of two directions including means to rotate said commutator step by step in one of said directions, means for controlling the extent of rotation of said commutator in the other of said directions, means operable under the control of the articles discharged from said container-means to operate said means for rotating said commutator step by step in said one direction, and means for preventing the supply of pulses to said discharge means when said commutator is rotated in the other direction.

6. Automatic article-picking apparatus comprising container-means for the articles to be picked, means operable to select the articles to be picked from said container-means, means automatically operative upon the selection of the articles to cause the discharge of the selected articles from said container-means, said last mentioned means comprising a plurality of ejector members associated with said container-means and companion members releasably engageable with said ejector members, respectively, and adapted to be operatively connected to and disconnected from said ejector members, respectively, under the control of said selecting means, and means automatically operative upon the discharge of a predetermined number of the selected articles from said container-means to condition said selecting means for another operation.

7. Automatic article-picking apparatus comprising container-means for the articles to be picked, means including a plurality of selector switches operable to select the articles to be picked, means automatically operative upon the selection of the articles to cause the discharge of the selected articles from said container-means, said last mentioned means comprising a plurality of ejector members associated with said container-means and companion members releasably engageable with said ejector members, respectively, and adapted to be operatively connected to and disconnected from said ejector members, respectively, under the control of said selecting means, and means automatically operative upon the discharge of a predetermined number of selected articles to condition said selecting means for another operation.

8. Automatic article-picking apparatus comprising container-means for the articles to be dispensed, electric-impulse operated selector switches, means operable under the control of said switches for selectively causing the discharge of articles from said container-means, and dial-controlled impulse generating means for supplying impulses to said selector switches for operating the latter.

9. Automatic article-picking apparatus comprising container-means for the articles to be dispensed, electric-impulse operated selector switches, means operable under the control of said switches for selectively causing the discharge of articles from said container-means, means for governing the number of operations of said discharge means whereby to predetermine the number of articles to be discharged, each of said selector switches being variably operable in accordance with the number of pulses suppled thereto, means for supplying impulses to said selector switches for operating the same, said governing means including a member movable in one direction from an initial position to a predetermined position for predetermining the number of selected articles to be discharged and movable in a different direction to said initial position for controlling the operations of said article-discharge means, and means operable during the operation of said selector switches for moving said governing member to said predetermined position.

10. Automatic article-picking apparatus comprising container-means for the articles to be dispensed, electric-impulse operated selector switches, means operable under the control of said switches for selectively causing the discharge of articles from said container-means, impulse-actuated means for governing the number of operations of said discharge means whereby to predetermine the number of articles to be discharged, each of said selector switches being variably operable in accordance with the number of pulses supplied thereto, means for supplying impulses to said selector switches and to said impulse-actuated means, said impulse-actuated means including means to supply impulses, and means operable at least in part under the control of said second mentioned impulse-supply means for actuating said discharge means.

11. Automatic article-picking apparatus comprising container-means for the articles to be dispensed, electric-impulse operated selector switches, means operable under the control of said switches for selectively causing the discharge of articles from said container-means, impulse-actuated means for governing the number of operations of said discharge means whereby to predetermine the number of articles to be discharged, said impulse-actuated means including means to supply impulses, means for actuating said discharge means, each of said selector switches being variably operable in accordance with the number of pulses supplied thereto, means for supplying impulses to said selector switches and to said impulse-actuated means, and to said actuating means for the discharge means whereby the latter is actuated under the joint control of said first-mentioned impulse-supplying means and said second mentioned impulse-supplying means.

12. In automatic article-picking apparatus having container-means for the articles to be picked, means operable to select the articles to be picked and to cause the discharge of the selected articles from said container-means including a frame movable from retracted position to projected position, a plurality of members associated with said container-means and selectively operable to cause the discharge of predetermined articles from said container-means, means carried by said frame selectively engageable with said members to operate the latter selectively, means for imparting said movements to said frame, and means for predetermining the number, either singular or plural, of said frame movements.

13. In automatic article-picking apparatus having container-means for the articles to be picked, means operable to select the articles to be picked and to cause the discharge of the selected articles from said container-means including a frame movable from retracted position to projected position, a plurality of members associated with said container means and selectively operable to cause the discharge of predetermined articles from said container-means, means carried by said frame selectively engageable with said members to operate the latter selectively, electric-responsive means for operating said engageable means to engage said members, means for imparting said movements to said frame, and means for predetermining the number, either singular or plural, of said frame movements.

14. In automatic article-picking apparatus having container-means for the articles to be picked, means operable to select the articles to be picked and to cause the discharge of the selected articles from said container-means including a frame movable in relation to said container-means from retracted position to projected position, a plurality of members associated with said container-means and selectively operable to cause the discharge of predetermined articles from said container-means, and means carried by said frame selectively engageable with said members to operate the latter selectively, electric-responsive means for operating said engageable means to engage said members, means for selectively energizing said electric-responsive means, means for imparting said movements to said frame, and means for predetermining the number, either singular or plural, of said frame movements.

15. In automatic article-picking apparatus having container-means for the articles to be picked, means operable to select the articles to be picked and to cause the discharge of the selected articles from said container-means including a frame movable in relation to said container-means from retracted position to projected position, a plurality of members associated with said container-means and selectively operable to cause the discharge of predetermined articles from said container-means, and means carried by said frame selectively engageable with said members to operate the latter selectively, electric-responsive means for operating said engageable means to engage said members, and impulse operated electric selector switches for selectively energizing said electric-responsive means.

16. In automatic article-picking apparatus having container-means for the articles to be picked, means operable to select the articles to be picked and to cause the discharge of the selected articles from said container-means including a frame movable in relation to said container-means from retracted position to projected position, a plurality of members associated with said container-means and selectively operable to cause the discharge of predetermined articles from said container-means, means carried by said frame selectively engageable with said members to operate the latter selectively, electric-responsive means for operating said engageable means carried by said frame to engage said members associated with said container-means, means for operating said frame to project and retract the latter, and means operable after a predetermined number of operations of said frame, to be deenergize said selected electric-responsive means thereby to release said selected selected members.

17. In automatic article-picking apparatus having container-means for the articles to be picked, means operable to select the articles to be picked and to cause the discharge of the selected articles from said container-means including a frame movable in relation to said conveyors from retracted position to projected position, a plurality of members associated with said container-means and selectively operable to cause the discharge of predetermined articles from said container-means, and means carried by said frame selectively engageable with said members to operate the latter selectively, electric-responsive means for operating said engageable means carried by said frame to engage said members associated with said container-means, impulse-operated electric selector switches for selectively energizing said electric-responsive means, and a dial-controlled impulse generating means for supplying impulses to said selector switches for operating the latter.

18. In automatic article-picking apparatus having container-means for the articles to be picked, means operable to select the articles to be picked and to cause the discharge of the selected articles from said container-means including a frame movable in relation to said container-means from retracted position to projected position, a plurality of members associated with said container means and selectively operable to cause the discharge of predetermined articles from said container-means, and means carried by said frame selectively engageable with said members to operate the latter selectively, electric-responsive means for operating said engageable means carried by said frame to engage said members associated with said container-means, means for supplying impulses to said selector switches for operating the latter, and means for governing the number of impulses supplied by said impulse-supplying means.

19. In automatic article-picking apparatus comprising container-means for the articles to be picked, the combination with means for causing articles to be discharged from said container-means under the control of a plurality of article selector cards, means normally operable under the control of said cards, respectively, to actuate said discharge means, selectively, to effect the discharge of a predetermined number of the selected articles, means automatically operable upon the discharge of the predetermined number of selected articles to transfer to one point the "filled" cards which correspond to the articles discharged in predetermined quantities under the control of said cards, respectively, and means, operable automatically upon the failure of said discharge means to effect the discharge of said predetermined number of selected articles, to transfer the corresponding "unfilled" cards, respectively, to a different point, whereby to separate the "unfilled" cards from the "filled" cards.

20. In automatic article-picking apparatus having a plurality of containers for different articles, respectively, the combination with means associated with said containers, respectively, operable selectively to cause the discharge of articles therefrom, of means to operate said discharge means selectively, and means operable under the control of said discharge means to interrupt the operation of the apparatus when other than the selected discharge means is operated.

21. In automatic article-picking apparatus having a plurality of containers for different articles, respectively, the combination with means associated with said containers, respectively, operable selectively to cause the discharge of articles therefrom, of means to operate said discharge means selectively, signalling means and means operable under the control of said discharge means to actuate said signalling means only when other than the selected discharge means is operated.

22. Automatic article-picking apparatus comprising a plurality of rows of article-containers each provided with an ejector member for discharging the articles from said containers, respectively, a frame mounted for reciprocation and carrying a plurality of solenoid operating latching members releasably engageable with said ejector members, respectively, for actuating the latter, there being one solenoid for each of said ejector members, means for reciprocating said frame, and means for energizing said solenoids, selectively, thereby to cause the operation of selected ejector members when said frame is reciprocated.

23. In automatic article-picking apparatus having container-means for the articles to be picked, the combination with electric-impulse operated or controlled devices for selectively discharging the articles from said container-means in predetermined quantities, respectively, of means for supplying electrical impulses to said devices, said last mentioned means comprising a rotary commutator, and means for rotating said commutator intermittently one revolution at a time.

24. In automatic article-picking apparatus comprising container-means for the articles to be picked, the combination with means for causing articles to be discharged from said container-means under the control of a plurality of primary-selector members, means normally operable under the control of said members, respectively, to actuate said discharge means, selectively, to effect the discharge of a predetermined number of the selected articles, means for transferring to one point the "filled" selector members which correspond to the articles discharged in predetermined quantities under the control of said selector members, respectively, and means, operable automatically upon the failure of said discharge means to effect the discharge of said predetermined number of selected articles, to transfer the corresponding "unfilled" selector members, respectively, to a different point, whereby to separate the "unfilled" selector members from the "filled" selector members.

25. In automatic article-picking apparatus, a plurality of containers for the articles to be picked, each of said containers having an article-ejecting member associated therewith, a frame mounted for movement in relation to said containers from a retracted position to a projected position and from the latter to the former, a plurality of electro-magnets carried by said frame, each provided with an armature arranged to engage a companion one of said ejecting members for operating the same when the companion electro-magnet is energized and said frame is moved from said retracted position to said projected position, a source of electric current, means including selector switches for selectively connecting said current source to said magnets to energize the same selectively whereby to connect one of said armatures to a predetermined companion ejecting member, and means for moving said frame for operating said predetermined ejecting member.

26. In automatic article-picking apparatus, a plurality of containers for the articles to be picked, each of said containers having an article-ejecting member associated therewith, a frame mounted for movement in relation to said containers from a retracted position to a projected position and from the latter to the former, and means for connecting said frame to a predetermined ejecting member for operating the latter when said frame is moved from said retracted position to said projected position, said connecting means comprising a plurality of members carried by said frame and each movable thereon from an inoperative position to an operative position for operative connection with a companion ejecting member upon said movement of the frame, means for selectively moving said frame members, and means for moving said frame from said retracted position to said projected position and from the latter to the former.

27. In automatic article-picking apparatus, a plurality of containers for the articles to be picked, each of said containers having an article-ejecting member associated therewith, a frame mounted for movement in relation to said containers from a retracted position to a projected position and from the latter to the former, means for connecting said frame to a predetermined ejecting member for operating the latter when said frame is moved from said retracted position to said projected position, said connecting means comprising a plurality of members carried by said frame and each movable thereon from an inoperative position to an operative position for operative connection with a companion ejecting member upon said movement of the frame, means for selectively moving said frame members, means for moving said frame from said retracted position to said projected position and from the latter to the former, and means automatically operative upon movement of the selected frame member to operative position to actuate said frame-moving means.

28. In automatic article-picking apparatus, a plurality of containers for the articles to be picked, each of said containers having an article-ejecting member associated therewith, a frame mounted for movement in relation to said containers from a retracted position to a projected position and from the latter to the former, means for connecting said frame to a predetermined ejecting member for operating the latter when said frame is moved from said retracted position to said projected position, said connecting means comprising a plurality of members carried by said frame and each movable thereon from an inoperative position to an operative position for operative connection with a companion ejecting member upon said movement of the frame, means for selectively moving said frame members, means for moving said frame from said retracted position to said projected position and from the latter to the former, means automatically operative upon movement of the selected frame member to operative position to actuate said frame-moving means, and means for restoring the selected frame member to inoperative position automatically upon a predetermined number of movements of said frame.

29. In automatic article-picking apparatus, a plurality of containers for the articles to be picked, each of said containers having an article-ejecting member associated therewith, a frame mounted for movement in relation to said containers from a retracted position to a projected position and from the latter to the former, a plurality of electro-magnets carried by said frame, each provided with an armature arranged to engage a companion one of said ejecting members for operating the same when the companion electromagnet is energized and said frame is moved from said retracted position to said projected position, a source of electric current, means including selector switches for selectively connecting said current source to said magnets to energize the same selectively whereby to connect one of said armatures to a predetermined companion ejecting member, means for moving said frame for operating said predetermined ejecting member, and means including an electro-magnet for controlling the operation of said frame-moving means, and means operable in response to the discharge of an article by said predetermined ejecting member for energizing said last mentioned electro-magnet.

30. In automatic article-picking apparatus, a plurality of containers for the articles to be picked, each of said containers having an article-ejecting member associated therewith, a frame mounted for movement in relation to said containers from a retracted position to a projected position and from the latter to the former, means for connecting said frame to a predetermined ejecting member for operating the latter when said frame is moved from said retracted position to said projected position, said connecting means comprising a plurality of members carried by said frame and each movable thereon from an inoperative position to an operative position for operative connection with a companion ejecting member upon said movement of the frame, means for selectively moving said frame members, means for moving said frame from said retracted position to said projected position and from the latter to the former, means operable to control the operation of said frame-moving means, and means operable in response to the discharge of an article by said predetermined ejecting member for operating said controlling means.

31. In automatic article-picking apparatus having a plurality of containers for different articles, respectively, the combination with means associated with said containers, respectively, operable selectively to cause the discharge of articles therefrom, of means to operate said discharge means selectively, a conveyor for transferring the discharged articles to a delivery station, and means for interrupting the operation of said conveyor when other than the selected discharge means is operated.

32. In automatic article-picking apparatus having a plurality of containers for different articles, respectively, the combination with means associated with said containers, respectively, operatable selectively to cause the discharge of articles therefrom, of means to operate said discharge means selectively, power actuated means operable to select the discharge means to be operated, and means to interrupt the operation of said power actuated means when other than the selected discharge means is operated.

33. In automatic article-picking apparatus having a plurality of containers for different articles, respectively, the combination with means associated with said containers, respectively, operable selectively to cause the discharge of articles therefrom, of means to operate said discharge means selectively, power actuated means operable to select the discharge means to be operated, a conveyor for transferring the discharged articles to a delivery station, and means to interrupt the operation of said power actuated means and to interrupt the operation of said conveyor when other than the selected discharge means is operated.

34. In automatic article-picking apparatus, the combination with a plurality of containers for the articles to be picked, power actuated means for selecting the articles to be picked and power actuated means for discharging the selected articles in predetermined quantities from their containers, of means for automatically controlling all of said previously mentioned means comprising a holder for a plurality of selector cards, means for moving said cards in succession from their positions in said holder to a different position, means operable automatically in response to the movements of said cards from said holder to said last mentioned position for controlling the actuations of said power actuated means, means for delivering said cards from said last mentioned position to one point when the number of articles called for thereby are discharged from said containers, means automatically operable to deliver the cards to a different point when said discharge means is actuated but fails to discharge the number of articles called for, whereby to separate the "unfilled" cards from the "filled" cards, and means automatically operable in response to said last mentioned actuation of the discharge means to provide the "unfilled" cards with quantitative indications of said failure.

35. In automatic article-picking apparatus, container-means for the articles to be picked, means operable to discharge a predetermined number of selected articles from said container-means, a conveyor for transferring the discharged articles to a receiving station, a receiver mounted for movement at said station for receiving the articles from said conveyor, means operable in timed relation to said conveyor to impart a predetermined movement to said receiver after said predetermined number of selected articles are transferred thereto by said conveyor, selector-card controlled means for governing the operation of said discharge means, means for moving the selector cards from a supply position through a controlling position and to a delivery station, a receiver at said delivery station for receiving said cards, said card receiver being mounted for movement, and means operable in timed relation to said conveyor for imparting a predetermined movement to said receiver in unison with the article receiver.

36. In automatic article-picking apparatus, container-means for the articles to be picked, means operable to discharge a predetermined number of selected articles from said container-means, a conveyor for transferring the discharged articles to a receiving station, a receiver mounted for movement at said station for receiving the articles from said conveyor, means operable in timed relation to said conveyor to impart a predetermined movement to said receiver after said predetermined number of selected articles are transferred thereto by said conveyor, selector-card controlled means for governing the operation of said discharge means, means for moving the selector cards from a supply position through a controlling position and to a delivery station, a receiver at said delivery station for receiving said cards, said card receiver being mounted for movement, means operable in timed relation to said conveyor for imparting a predetermined movement to said receiver in unison with the article receiver, a second receiver for said cards, and means, operable upon the failure of the discharge means to discharge the predetermined number of selected articles called for by a particular card, to deliver said "unfilled" card from said delivery station to said second card-receiver instead of to said first mentioned card-receiver.

37. In automatic article-picking apparatus, container-means for the articles to be picked, means operable to discharge a predetermined number of selected articles from said container-means, a conveyor for transferring the discharged articles to a receiving station, a receiver mounted for rotation at said station for receiving the articles from said conveyor, means operable in timed relation to said conveyor to impart a partial rotation to said receiver after said predetermined number of selected articles are transferred thereto by said conveyor, selector-card controlled means for governing the operation of said discharge means, means for moving the selector cards from a supply position through a controlling position and to a delivery station, a receiver at said delivery station for receiving said cards, said card receiver being mounted for rotation, means operable in timed relation to said conveyor for imparting a partial rotation to said receiver in unison with the article receiver, a second receiver for said cards, means, operable upon the failure of the discharge means to discharge the predetermined number of selected articles called for by a particular card, to deliver said "unfilled" card from said delivery station to said second card-receiver instead of to said first mentioned card-receiver, said second card-receiver being mounted for rotation, and means operable in timed relation to said conveyor, for imparting a partial rotation to said second card-receiver in unison with said article receiver.

38. In automatic article-picking apparatus having container-means for the articles to be picked, means for discharging the articles from said container-means, means for operating said article-discharge means, and means for actuating said operating means, impulse-operated means for controlling said actuating means, means operatively connected to said impulse-operated means for supplying a variable predetermined either singular or plural number of impulses thereto whereby said actuating means is operated accordingly a predetermined either singular or plural number of times, said impulse-supplying means comprising a movable commutator, means for moving said commutator from an initial position a predetermined extent in one direction prior to the operation of said discharge means, and means operable during the operation of said article-discharge means for moving said commutator in the opposite direction to said initial position thereof.

39. In automatic article-picking apparatus having container-means for the articles to be picked, means for discharging the articles from said container-means, means for operating said article-discharge means, and means for actuating said operating means, impulse-operated means for controlling said actuating means, means operatively connected to said impulse-operated means for supplying a variable predetermined either singular or plural number of impulses thereto whereby said actuating means is operated accordingly a predetermined number of times, said impulse-supplying means comprising a movable commutator, means for moving said commutator from an initial position a predetermined extent in one direction prior to the operation of said discharge means, and impulse-actuated means operable during the operation of said article-discharge means for moving said commutator in the opposite direction to said initial position thereof.

40. In automatic article-picking apparatus having container-means for the articles to be picked, means for discharging the articles from said container-means, means for operating said article-discharge means, and means for actuating said operating means, impulse-operated means for controlling said actuating means, means operatively connected to said impulse-operated means for supplying a variable predetermined either singular or plural number of impulses thereto whereby said actuating means is operated accordingly a predetermined either singular or plural number of times, said impulse-supplying means comprising a rotary commutator, means for turning said commutator from an initial position a predetermined extent in one direction prior to the operation of said discharge means, and means operable successively under the control of the discharged articles for turning the said commutator step-by-step in the opposite direction to said initial position thereof, said last mentioned means including a movable member in the path of and actuated by the articles as the latter are discharged from said container-means.

41. In automatic article-picking apparatus having container means for the articles to be picked, means for discharging the articles from said container-means, means for operating said article-discharge means, and means for actuating said operating means, impulse-operated means for controlling said actuating means, means operatively connected to said impulse-operated means for supplying a predetermined number of impulses thereto whereby said actuating means is operated a predetermined number of times, said impulse-supplying means comprising a rotary commutator, means for turning said commutator from an initial position a predetermined extent in one direction prior to the operation of said discharge means, means operable successively under the control of the discharged articles for turning said commutator step-by-step in the opposite direction to said initial position thereof, and means, automatically operable upon the failure of said discharge means to discharge an article when said discharge means is operated, to return said commutator to the intial position.

42. In automatic article-picking apparatus having container-means for the articles to be picked, means for discharging the articles from said container-means, means for operating said article-discharge means, and means for actuating said operating means, impulse-operated means for controlling said actuating means, means operatively connected to said impulse-operated means for supplying a predetermined number of impulses thereto whereby said actuating means is operated a predetermined number of times, said impulse-supplying means comprising a rotary commutator, means for turning said commutator from an initial position a predetermined extent in one direction prior to the operation of said discharge means, means operable successively under the control of the discharged articles for turning said commutator step-by-step in the opposite direction to said initial position thereof, means automatically operable, upon the failure of said discharge means to discharge an article when said discharge means is operated, to return said commutator to the initial position, and means automatically operable, upon the occurrence of said failure, to indicate the same.

43. In automatic article-picking apparatus having container-means for the articles to be picked and means operable under the control of prefabricated primary-selector means for discharging articles selectively in predetermined numbers from said container-means, means operable upon the failure of said discharge means, when operated to discharge articles from said container-means, to indicate said failure quantitatively on said prefabricated selector means, said failure indicating means comprising a rotary member, means for turning said member in timed relation to the operation of said discharge means, and means operated in response to said failure for engaging said rotary member temporarily with said prefabricated selector means.

44. In automatic article-picking apparatus having container-means for the articles to be picked and means operable under the control of prefabricated primary-selector means for discharging articles selectively in predetermined numbers from said container-means, means operable upon the failure of said discharge means, when operated to discharge articles from said container-means, to indicate said failure quantitatively on said prefabricated selector means, said failure indicating means comprising a rotary member, means for turning said member in timed relation to the operation of said discharge means, means operated in response to said failure for engaging said rotary member temporarily with said prefabricated selector means, and means operable under the control of the retractive movement of said member to discharge the selector means having said failure-indication thereon.

BERTRAM J. GOLDSMITH.